(12) United States Patent
Hagen, Jr.

(10) Patent No.: US 7,168,216 B2
(45) Date of Patent: *Jan. 30, 2007

(54) INSULATED STUD PANEL AND METHOD OF MAKING SUCH

(75) Inventor: Hans T. Hagen, Jr., 941 NE. Hillwind Rd., Suite 300, Fridley, MN (US) 55432

(73) Assignees: Hans T. Hagen, Jr., Wayzata, MN (US); Hans T. Hagen, III, Rogers, MN (US)

( * ) Notice: Subject to any disclaimer, the term of this patent is extended or adjusted under 35 U.S.C. 154(b) by 85 days.

This patent is subject to a terminal disclaimer.

(21) Appl. No.: 11/004,056

(22) Filed: Dec. 3, 2004

(65) Prior Publication Data

US 2005/0188649 A1 Sep. 1, 2005

Related U.S. Application Data

(63) Continuation-in-part of application No. 10/860,882, filed on Jun. 4, 2004.

(60) Provisional application No. 60/476,774, filed on Jun. 6, 2003.

(51) Int. Cl.
*E04B 1/74* (2006.01)

(52) U.S. Cl. ............... 52/480; 52/404.3; 52/742.13; 52/745.09

(58) Field of Classification Search ............ 52/742.13, 52/743, 404.3, 481.1, 480, 794.1, 745.09
See application file for complete search history.

(56) References Cited

U.S. PATENT DOCUMENTS

| 249,645 | A | 11/1881 | Love |
| 1,096,773 | A | 5/1914 | Vernon |
| 2,132,032 | A | 10/1938 | Jacobsen |
| 2,858,580 | A | 11/1958 | Thompson |
| 2,885,008 | A | 5/1959 | Hoffer |
| 2,989,790 | A * | 6/1961 | Brown ............... 52/742.13 |
| 3,258,889 | A | 7/1966 | Butcher |
| 3,300,931 | A | 1/1967 | Lutze |
| 3,305,986 | A | 2/1967 | Mathews |
| 3,363,378 | A | 1/1968 | Palfey |

(Continued)

FOREIGN PATENT DOCUMENTS

JP 6-136833 5/1994

*Primary Examiner*—Carl D. Friedman
*Assistant Examiner*—Basil Katcheves

(57) ABSTRACT

A stud panel and method of making a stud panel where interior sheathing may be a temporary piece of transparent plastic or a permanent panel of sheet rock so as to retain insulation in place and minimize scarfing. The stud panel may include studs having through holes extending in a length direction of the stud panel such that insulation in adjacent inner regions separated by such studs interlock with each other and contribute to a structural integrity of the stud panel. The stud panel may include a space between inner studs and one of the exterior and interior sheathing so as to provide a thermal and sound break between the exterior and inner sheathing so as to minimize heat, air and sound transfer between the exterior and interior sheathing. A method of making the stud panel is further disclosed, where such a method may include the step of incrementally introducing insulation from a closed end of an inner region to an open end of an inner region and may further include the step of automatically introducing insulation into the inner regions of the stud panel.

21 Claims, 23 Drawing Sheets

U.S. PATENT DOCUMENTS

| | | | |
|---|---|---|---|
| 3,591,993 A | 7/1971 | Reeves | |
| 3,611,653 A | 10/1971 | Zinn | |
| 3,619,437 A * | 11/1971 | McDonald Jr. | 264/46.6 |
| 3,621,624 A | 11/1971 | Gustafson | |
| 3,641,724 A | 2/1972 | Palmer | |
| 3,785,913 A | 1/1974 | Hollamore | |
| 3,962,120 A | 6/1976 | Chiocchio et al. | |
| 4,004,387 A | 1/1977 | Ellingson | |
| 4,109,436 A | 8/1978 | Berloty | |
| 4,112,646 A | 9/1978 | Clelland | |
| 4,134,242 A * | 1/1979 | Musz et al. | 52/309.1 |
| 4,177,618 A * | 12/1979 | Felter | 52/742.13 |
| 4,204,977 A | 5/1980 | Zwirlein | |
| 4,239,916 A | 12/1980 | Zimmerman et al. | |
| 4,259,028 A | 3/1981 | Cook | |
| 4,260,569 A | 4/1981 | Hurst | |
| 4,407,982 A | 10/1983 | Elgie | |
| 4,451,587 A | 5/1984 | Keshi et al. | |
| 4,471,591 A | 9/1984 | Jamison | |
| 4,671,032 A | 6/1987 | Reynolds | |
| 4,712,347 A * | 12/1987 | Sperber | 52/404.1 |
| 4,829,738 A * | 5/1989 | Moss | 52/742.13 |
| 4,856,244 A | 8/1989 | Clapp | |
| 4,950,694 A | 8/1990 | Hager | |
| 4,992,483 A | 2/1991 | Sylvester | |
| 5,067,296 A | 11/1991 | Brown et al. | |
| 5,192,598 A | 3/1993 | Forte et al. | |
| 5,278,197 A | 1/1994 | Jacobs et al. | |
| 5,287,674 A * | 2/1994 | Sperber | 52/742.13 |
| 5,297,369 A | 3/1994 | Dickinson | |
| 5,365,716 A * | 11/1994 | Munson | 52/742.13 |
| 5,373,028 A | 12/1994 | McAfee et al. | |
| 5,500,452 A | 3/1996 | Baker, Jr. et al. | |
| 5,526,957 A | 6/1996 | Brown et al. | |
| 5,596,059 A | 1/1997 | Hager et al. | |
| 5,638,651 A | 6/1997 | Ford | |
| 5,641,368 A * | 6/1997 | Romes et al. | 156/71 |
| 5,666,780 A * | 9/1997 | Romes et al. | 52/742.13 |
| 5,701,709 A | 12/1997 | Dixon, III | |
| 5,758,463 A | 6/1998 | Mancini | |
| 5,765,330 A | 6/1998 | Richard | |
| 5,842,276 A | 12/1998 | Asher et al. | |
| 5,953,883 A | 9/1999 | Ojala | |
| 6,023,897 A | 2/2000 | Leslie et al. | |
| 6,026,629 A | 2/2000 | Strickland et al. | |
| 6,044,603 A | 4/2000 | Bader | |
| 6,085,479 A | 7/2000 | Carver | |
| 6,205,729 B1 | 3/2001 | Porter | |
| 6,226,943 B1 * | 5/2001 | Grinshpun et al. | 52/309.4 |
| 6,279,284 B1 | 8/2001 | Moras | |
| 6,283,221 B2 | 9/2001 | Hurray et al. | |
| 6,308,491 B1 | 10/2001 | Porter | |
| 6,408,594 B1 | 6/2002 | Porter | |
| 6,465,569 B1 | 10/2002 | Kurth | |
| 6,481,172 B1 | 11/2002 | Porter | |
| 6,557,313 B1 * | 5/2003 | Alderman | 52/407.3 |
| 6,583,192 B2 | 6/2003 | Falke et al. | |
| 6,590,008 B1 | 7/2003 | Parfondry et al. | |
| 6,686,435 B1 | 2/2004 | Petrovic et al. | |
| 6,692,670 B2 | 2/2004 | Moriarty et al. | |
| 6,695,224 B2 | 2/2004 | Hunter | |
| 6,698,157 B1 | 3/2004 | Porter | |
| 6,699,426 B1 | 3/2004 | Burke | |
| 6,706,774 B2 | 3/2004 | Munzenberger et al. | |
| 6,857,241 B1 * | 2/2005 | Pellicer | 52/583.1 |

\* cited by examiner

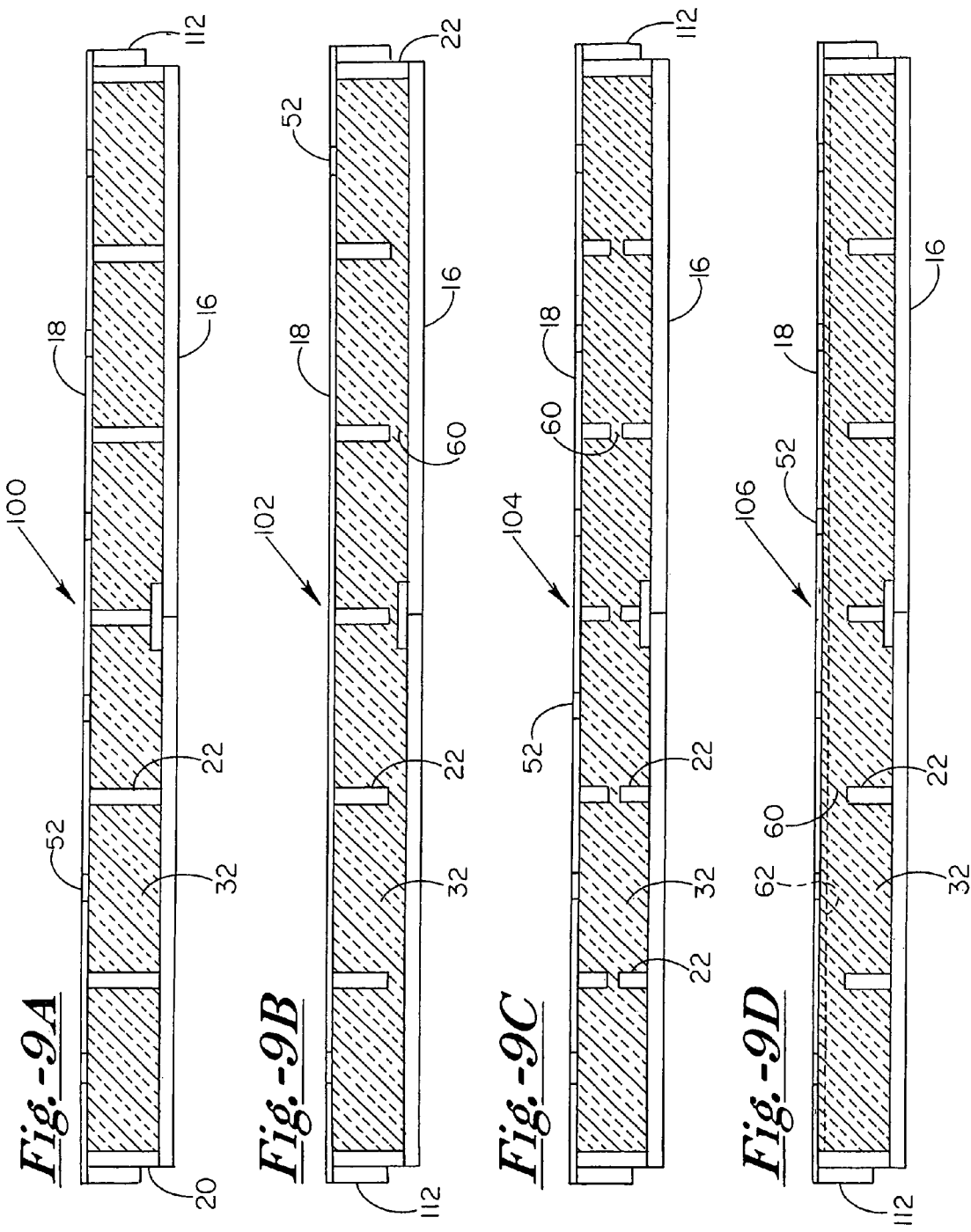

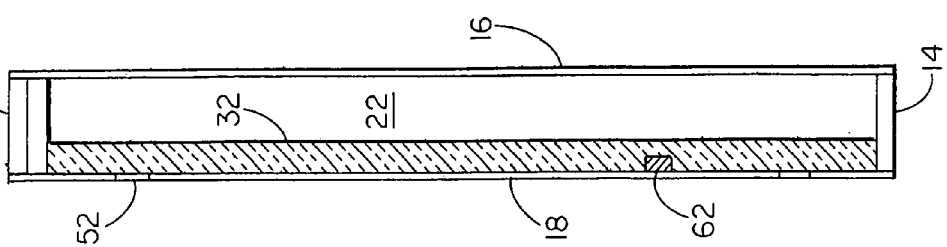
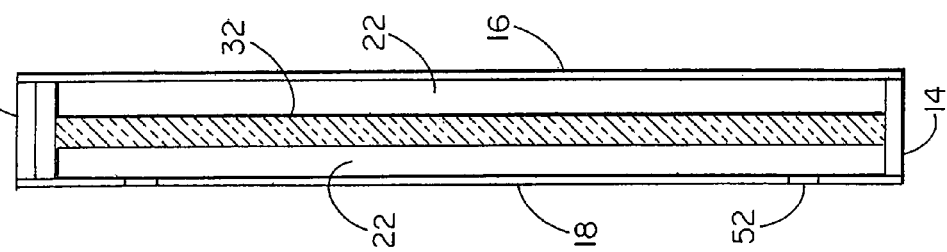
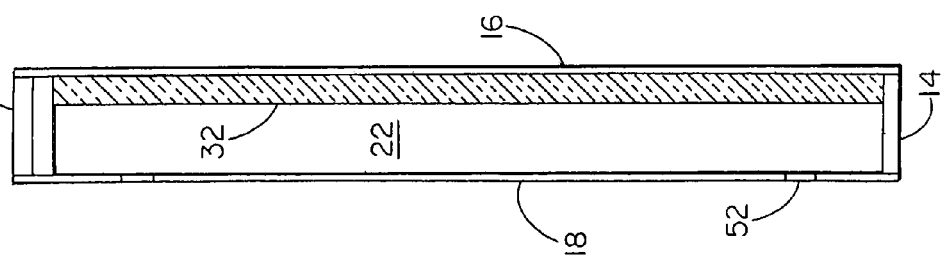
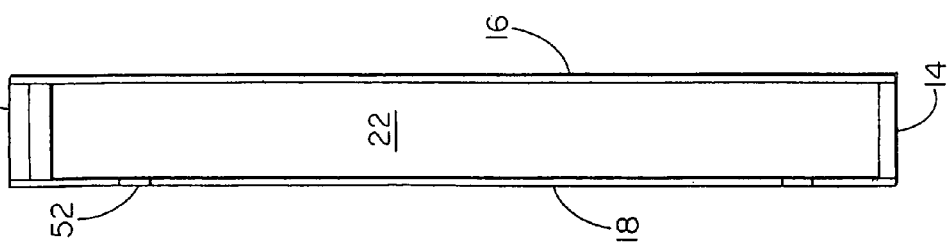

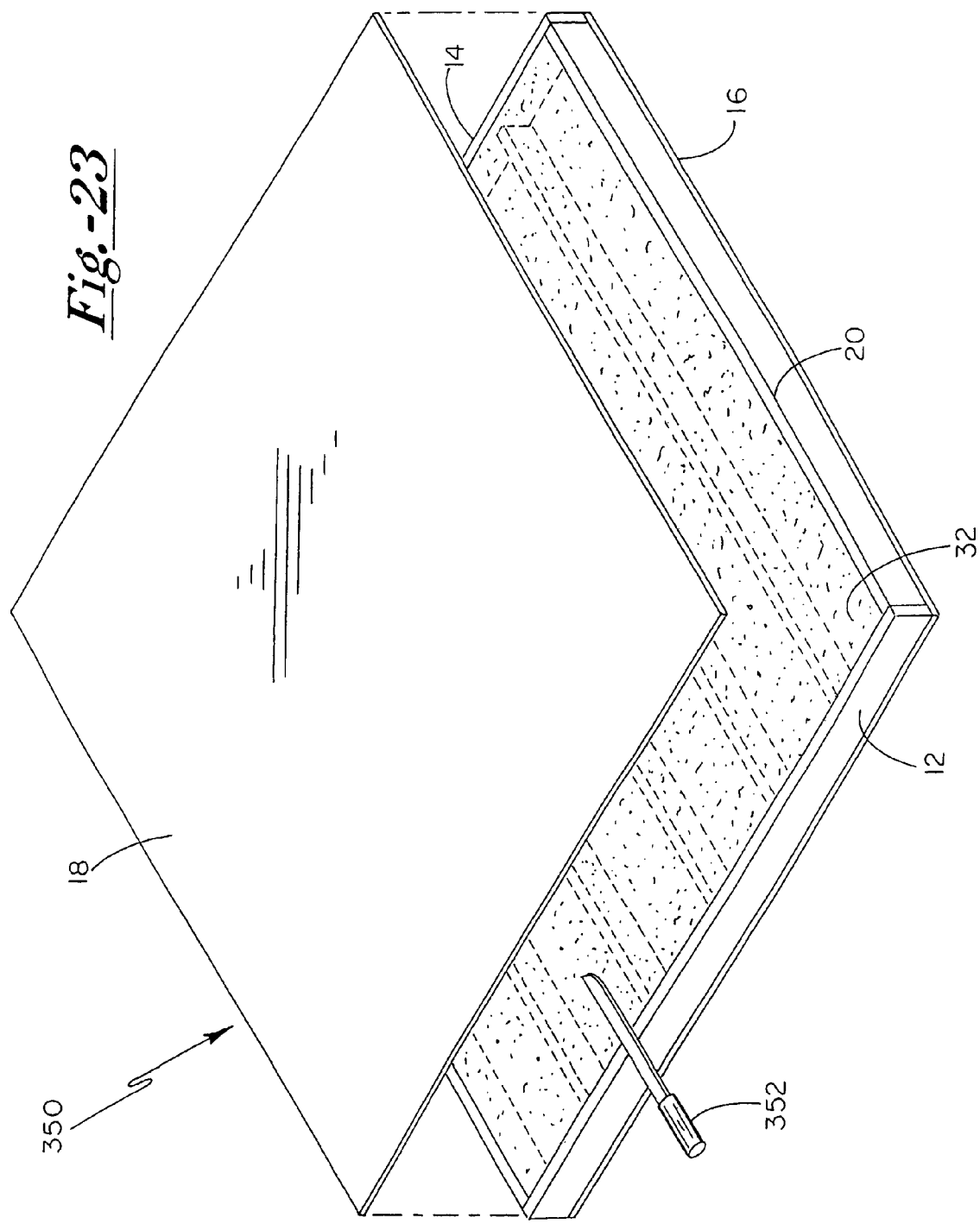

INSULATED STUD PANEL AND METHOD OF MAKING SUCH

This application claims the benefit under 35 U.S.C. 120 of U.S. patent application Ser. No. 10/860,882 filed Jun. 4, 2004, which claims priority under 35 U.S.C. 119(e) to U.S. Provisional Patent Application No. 60/476,774 filed Jun. 6, 2003. Each of these applications, i.e., U.S. patent application Ser. No. 10/860,882 and U.S. Provisional Patent Application No. 60/476,774, is hereby incorporated by reference in its entirety into this application.

FIELD OF THE INVENTION

The present invention relates generally to a stud panel, more particularly to an insulated stud panel, and specifically to a prefabricated insulated stud panel.

BACKGROUND OF THE INVENTION

Features of the present invention provide solutions to a number of problems now found in the housing industry. One problem relates to scarfing. "To scarf" means to trim or to cut off excess material. Scarfing, in the housing industry, means to trim or cut off insulation which protrudes from or has expanded outside of desired areas. Scarfing is an undesirable job in the housing industry because it consumes a great amount of time, provides merely a rough or coarse trim, wastes insulation, requires the user to find land fills that accept insulation waste, and then requires the user to actually transport the waste material to such land fills.

Another problem is the acceptance of standard uses for standard products. Whereas an efficient culture may find a use for each and every part of each and every animal that is killed, an inefficient culture may dispose of a great portion of the same animal. Likewise, an open mind finds a means for employing standard products in different manners to provide for better end results.

Another problem is a poorly insulated exterior wall. Heat and money can pour out of a house.

SUMMARY OF THE INVENTION

A feature of the present invention is the provision in method of making a stud panel having first and second plates, exterior and interior sheathing, and a set of studs between the first and second plates and further between the exterior and interior sheathing, of the steps of providing an opening in the stud panel leading to an inner region of the stud panel and then introducing insulation into the inner region of the stud panel via the opening.

Another feature of the present invention is the provision in such a method, of the step of permitting the interior sheathing to be removable from the stud panel without damaging the integrity of the interior sheathing or stud panel as a whole such that the removable interior sheathing may be a rigid panel of transparent plastic temporarily fixed in place or laying on top of a remainder of the stud panel.

Another feature of the present invention is the provision in such a method of the step of spacing an edge of one of the exterior and interior sheathing from one of the first and second plates to provide an opening in each of inner regions between the studs through which insulation can be readily introduced and across which excess insulation can be readily trimmed or scarfed.

Another feature of the present invention is the provision in such a method, of the step of incrementally introducing insulation from a closed end of an inner region defined by adjacent studs to an open end of the inner region.

Another feature of the present invention is the provision in such a method, of the step of tying insulation separated by studs to each other by introducing the insulation into holes formed in the studs such that insulation in one inner region communicates with insulation in an adjacent region, which insulation in turn may communicate with insulation in still a further inner region.

Another feature of the present invention is the provision in such a method, of the step of tying insulation in one inner region to insulation in another inner region by providing for studs that terminate short of one of the exterior and interior sheathing such that insulation extends between such studs and one of the exterior and interior sheathing and thus further extends between adjacent regions.

Another feature of the present invention is the provision in such a method, of the step of selecting the studs to confront the exterior sheathing and to be spaced from the interior sheathing to provide for a thermal and acoustic break between the studs, or inner studs, and the interior sheathing, with insulation being disposed in the thermal and acoustic break and further tying together insulation in adjacent inner regions.

Another feature of the present invention is the provision in such a method, of the step of automatically introducing insulation into the inner regions of the stud panel.

Another feature of the present invention is the provision in a stud panel having first and second plates, exterior and interior sheathing, and a set of studs between the first and second plates and further between the exterior and interior sheathing, of insulation in inner regions of the stud panel and running to and between the first and second plates, to and between the exterior and interior sheathing, and to and between adjacent studs such that the stud panel is substantially completely filled with said insulation.

Another feature of the present invention is the provision in such a stud panel, of the interior sheathing including a transparent solid portion.

Another feature of the present invention is the provision in such a stud panel, of the interior sheathing being sheet rock.

Another feature of the present invention is the provision in such a stud panel, of one of the exterior and interior sheathing having an edge spaced from one of the first and second plates such that an opening, through which insulation can be provided, leads into each of inner regions defined by studs.

Another feature of the present invention is the provision in such a stud panel, of the panel including a pair of outer studs and a set of inner studs, with the inner studs having at least one opening through which insulation extends such that insulation in one inner region communicates with insulation in an adjacent inner region.

Another feature of the present invention is the provision in such a stud panel, of one stud including a width less than a distance between the exterior and interior sheathing, with the stud confronting one of the exterior and interior sheathing and being spaced from the other of the exterior and interior sheathing, and with insulation being between the stud and the sheathing from which the stud is spaced, whereby transmission of heat and sound is minimized between the exterior and interior sheathing.

Another feature of the present invention is the provision in such a stud panel, of the interior sheathing being free of inner studs, with the inner studs of the stud panel being spaced from the interior sheathing and confronting the exterior sheathing.

Another feature of the present invention is the provision in such a stud panel, of the stud panel being a prefabricated stud panel.

Another feature of the present invention is the provision in a prefabricated stud panel, of a method including the steps of a) building a frame comprising first and second plates, outer studs, and inner studs; b) engaging one of exterior and interior sheathing on a first face of the frame such that a second face of the frame is an open face; c) introducing cellular polymer insulation into the frame via the open face of the frame and into at least one inner region; and then d) engaging the other of the exterior and interior sheathing on the second face of the frame to close off the open face to form the prefabricated stud panel.

Another feature of the present invention is the provision in a method of making a prefabricated stud panel, of the step of introducing cellular polymer insulation including the steps of first introducing cellular polymer insulation into a frame to a first face of the frame and subsequently introducing cellular polymer insulation to generally a plane terminating short of a second face of the frame, wherein the plane and the second face are generally parallel to each other and such that a space is formed between the plane, where the cellular polymer insulation terminates, and the second face where sheathing will be engaged.

Another feature of the present invention is the provision in a prefabricated stud panel, of the provision of an inner cast in inner regions and running to and between first and second plates, to and between exterior and interior sheathing, and to and between adjacent studs such that the prefabricated stud panel is substantially completely filled with insulation, and with the inner cast further extending laterally of each of the inner studs.

Another feature of the present invention is the provision in a prefabricated stud panel, of the provision of each of the inner studs being offset from interior sheathing such that the interior sheathing is free of inner studs such that a thermal and sound break is formed between the interior sheathing and the inner studs, and with cellular polymer insulation being disposed in the thermal and sound break; and wherein the cellular polymer insulation terminates generally short of the exterior sheathing such that an air space is formed adjacent to the exterior sheathing, with the cellular polymer insulation running in a width direction from where the cellular polymer terminates generally short of the exterior sheathing to the interior sheathing to provide support for the interior sheathing.

An advantage of the present invention is cost. Scarfing is minimized, thereby minimizing the cost of labor. Insulation waste is minimized, thereby minimizing the material cost and minimizing the cost of disposal in land fills that accept insulation waste. One of the features contributing to this advantage is the retainer, such as the exterior or interior sheathing, that is temporarily or permanently placed on the stud panel prior to introducing insulation into the stud panel.

Another advantage of the present invention is an efficient use of materials. Insulation, normally providing only an insulative attribute, provides a structural attribute (without being structural insulation per se) when insulation in adjacent inner regions of the stud panel communicate such that insulation throughout the stud panel is tied together and is essentially one-piece and integral. A feature contributing to this advantage is the thermal break provided by the studs that terminate short of one of the exterior or interior sheathing.

Another feature contributing to this advantage is the hole or set of holes formed in the inner studs and through which insulation extends.

Another advantage of the present invention is that such tied together insulation foam is of a relatively low density. Low density foam is not normally considered to be structural foam. However, here, by filling up all possible spaces and by further tying foam together from adjacent inner regions defined by studs, such low density foam provides strength and support.

Another advantage of the present invention is a stud panel having a greater R-value. A feature contributing to this advantage is the introduction of insulation to substantially all of the inner regions of the stud panel. Another feature contributing to this advantage is the retainer, such as the exterior or interior sheathing, against which insulation is formed in a flat and smooth fashion. Insulation formed in such a flat and smooth fashion need not be scarfed, such as when temporary sheathing is removed from the stud panel, and thus can confront or fit up snugly against permanent sheathing fixed in place so as to minimize empty space not filled with insulation. Such empty space is often formed by scarfing, especially fast and inattentive scarfing. Another feature contributing to this feature is the thermal break that is provided by the stud terminating short of one of the exterior or interior sheathing.

Another advantage of the present invention is that heat transfer to and from the house is minimized by minimizing the number of studs that interact directly with sheathing of the house, such as by offsetting each of the inner studs from the interior sheathing.

Another advantage of the present invention is that air will not circulate within the wall cavity or inner region thereby restricting moist warm air from condensing on cooler sheathing which causes growth of mold, sheathing to deteriorate and wet-rot to structural wood members.

Another advantage of the present invention is that air will not pass through small holes in sheathing when fasteners, air duct or openings are inserted through sheathing.

IN THE DRAWINGS

Figure 5:
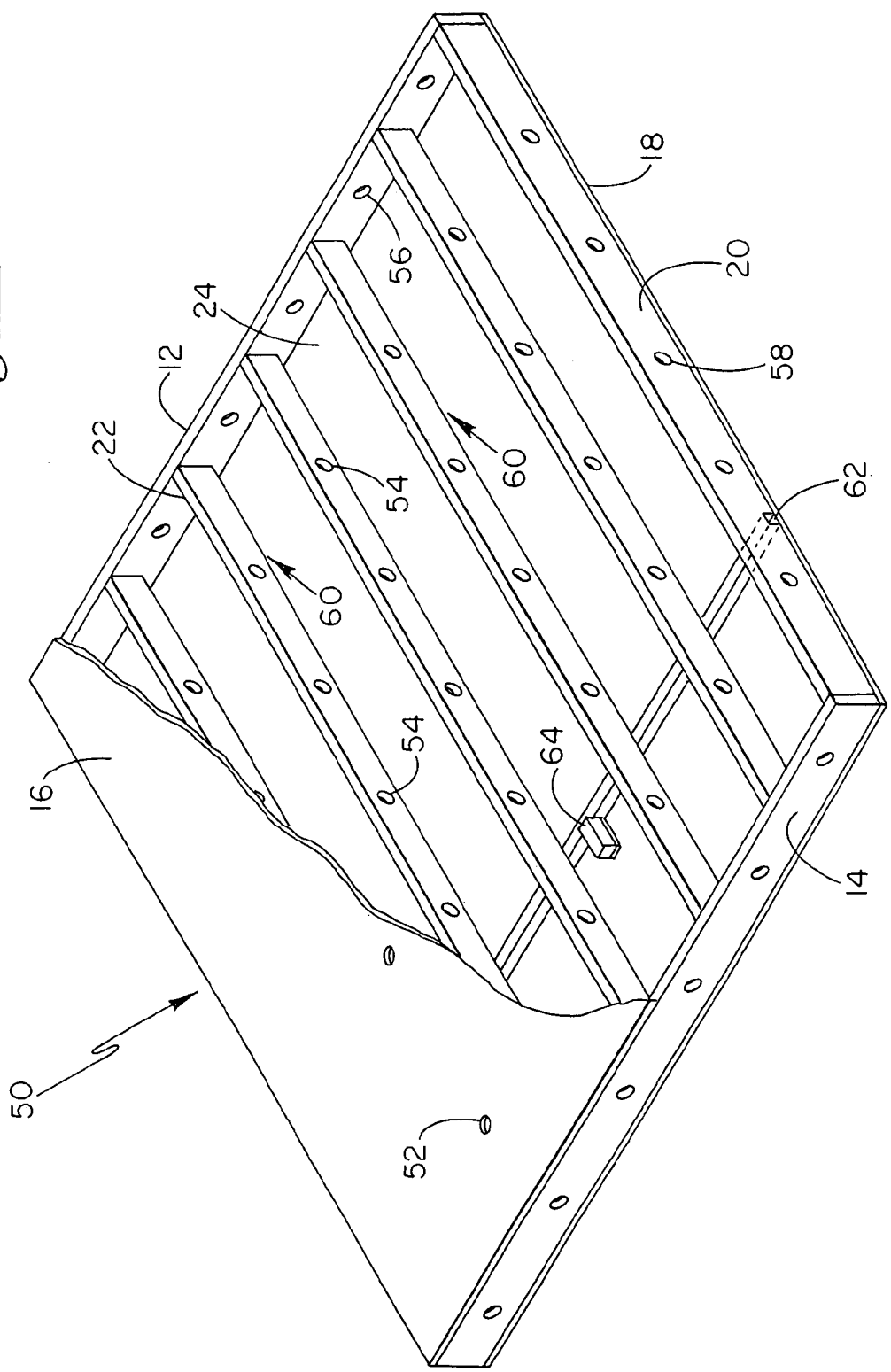

FIG. 5 shows an alternative embodiment of the present invention and shows a perspective view of a stud panel where the stud panel includes permanent interior sheathing, where the permanent interior sheathing includes openings through which insulation and electrical chase can be introduced, where the studs include openings through which insulation and electrical chase can be introduced, and where the plates include openings through which insulation and electrical chase can be introduced.

Figure 6:
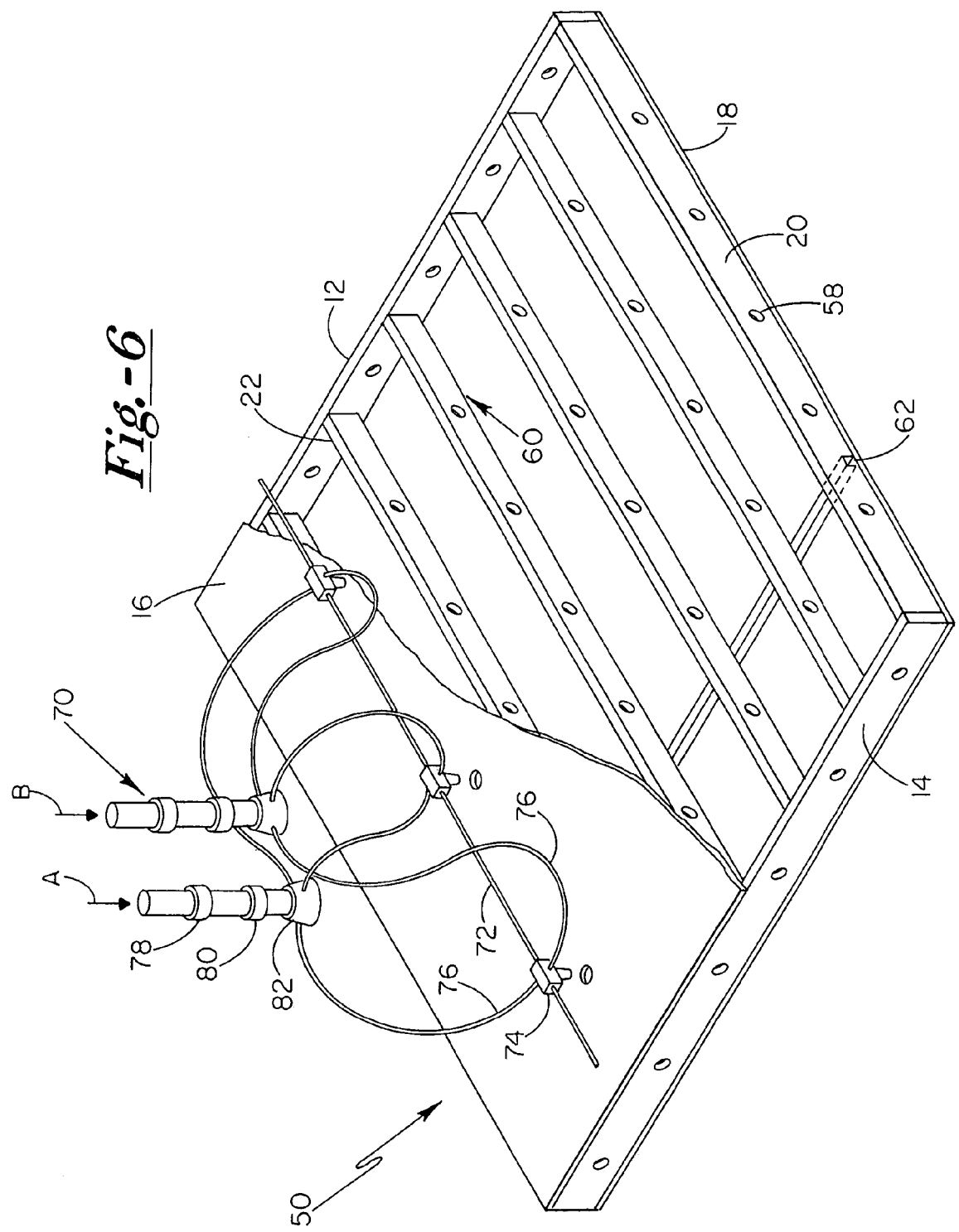

FIG. 6 shows a perspective view of the stud panel of

FIG. 5 and an apparatus for automatically introducing insulation into the inner regions of the stud panel.

Figure 7:
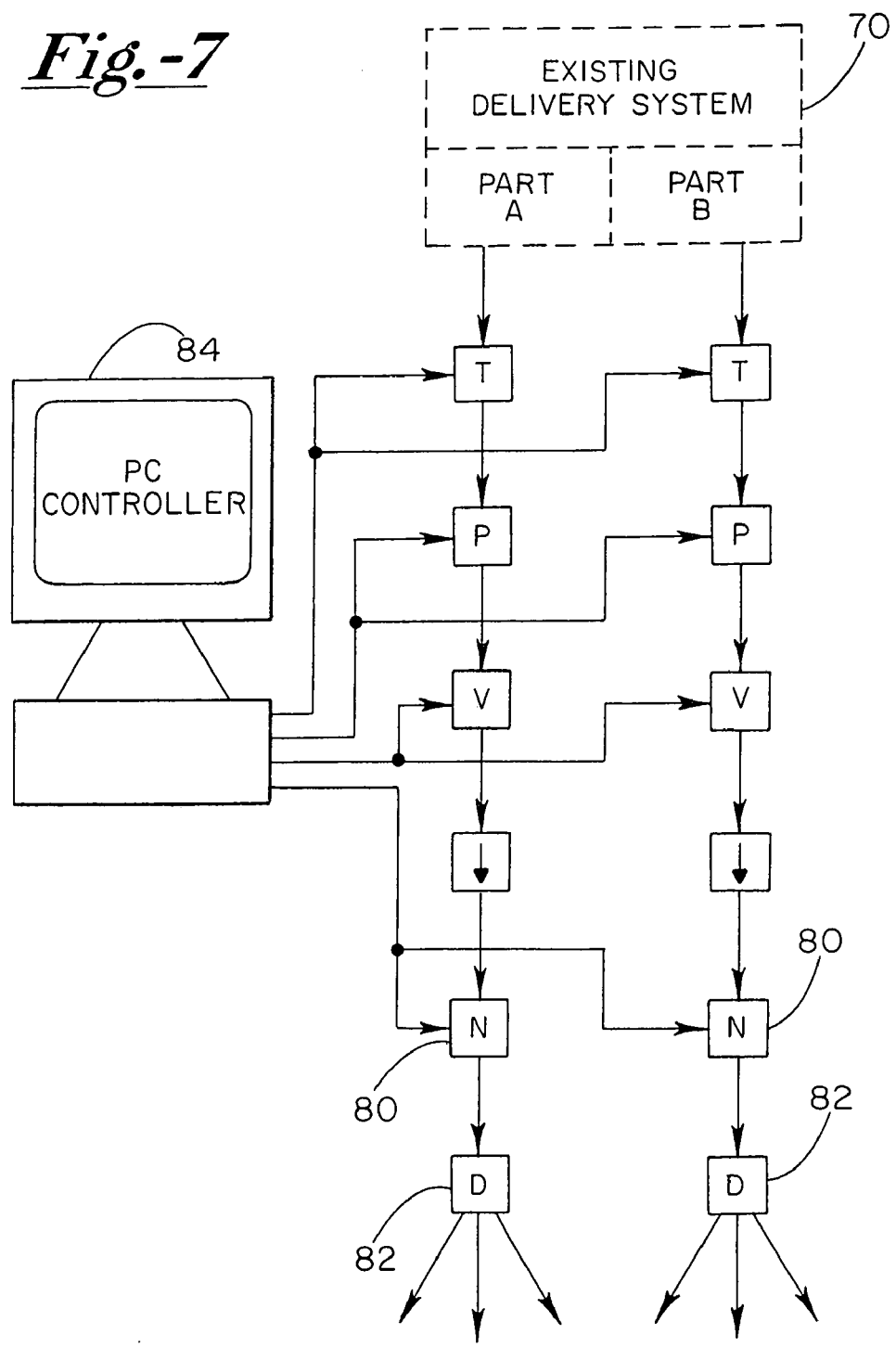

FIG. 7 is a diagrammatic view showing parameters that can be controlled by the apparatus of FIG. 6.

Figure 8:
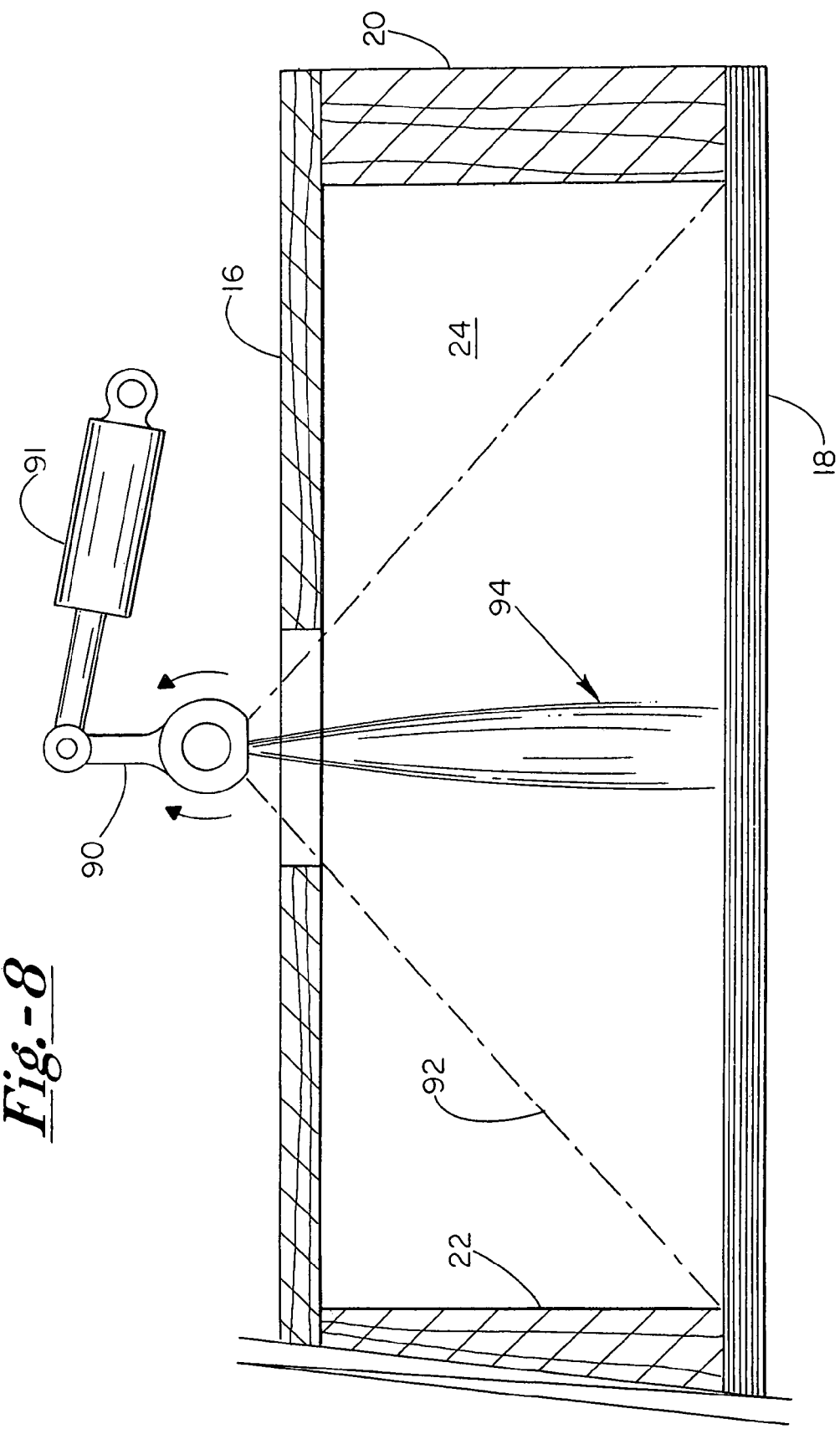

FIG. 8 is a diagrammatic section view showing a preferred manner of introducing insulation into an inner region of the present stud panel of FIG. 6.

FIG. 9A is a horizontal section view of one embodiment of the present stud panel where inner studs confront each of the exterior and interior sheathing.

FIG. 9B is a horizontal section view of one embodiment of the present stud panel where inner studs confront interior sheathing and are spaced from exterior sheathing.

FIG. 9C is a horizontal section view of one embodiment of the present stud panel where each of the inner studs confronts one of the exterior and interior sheathing and is spaced from the other of the exterior and interior sheathing.

FIG. 9D is a horizontal section view of one embodiment of the present stud panel where the inner studs confront the exterior sheathing and are spaced from the interior sheathing.

FIG. 10A is a vertical section view of the embodiment of FIG. 9A.

FIG. 10B is a vertical section view of the embodiment of FIG. 9B.

FIG. 10C is a vertical section view of the embodiment of FIG. 9C.

FIG. 10D is a vertical section view of the embodiment of FIG. 9D.

Figure 11:
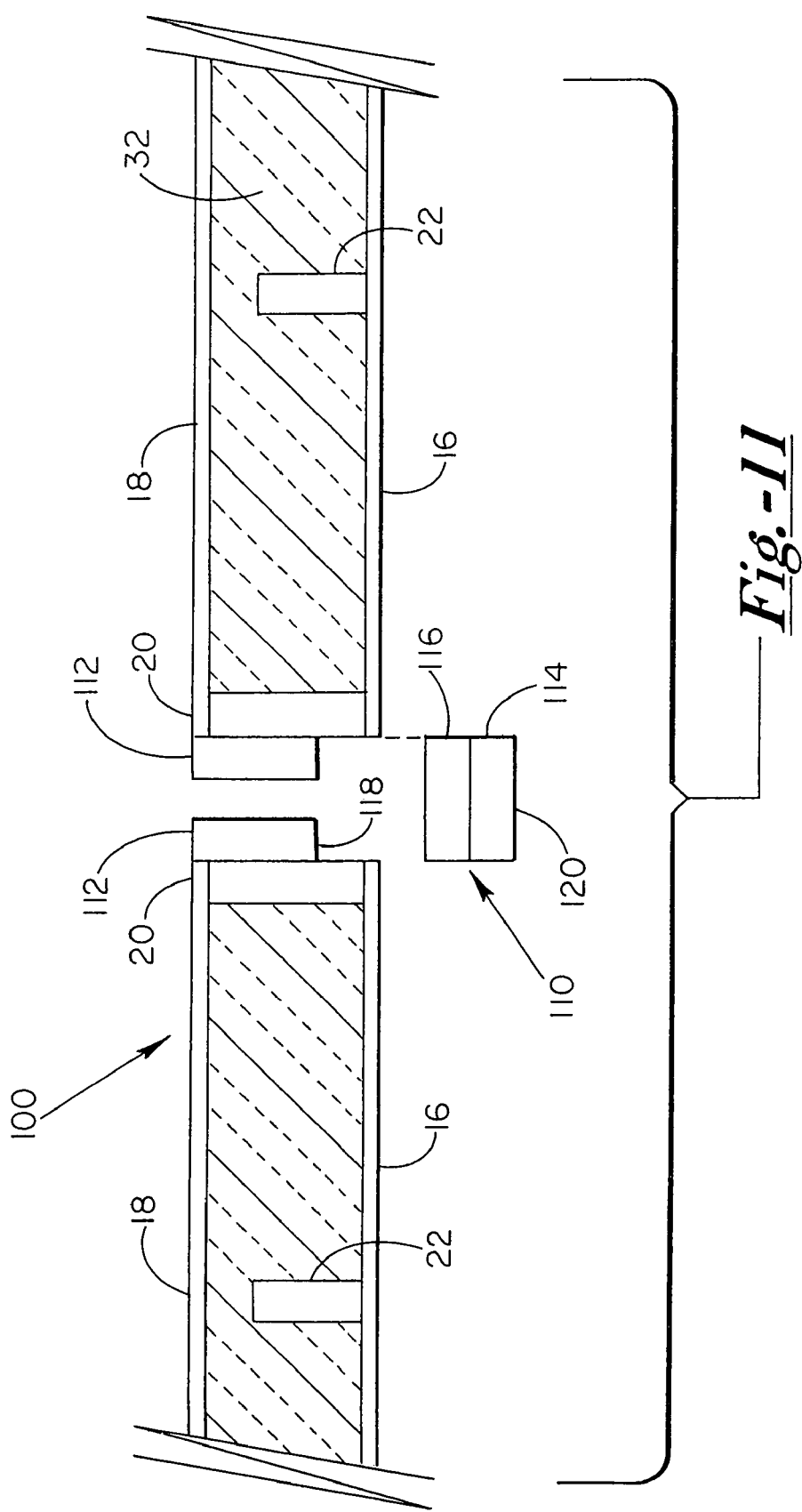

FIG. 11 is a diagrammatic view of end portions of adjacent stud panels prior to the stud panels being engaged with a key stud, where the key stud has a gasket plate to minimize transmission of fluid such as air and moisture.

Figure 12A:
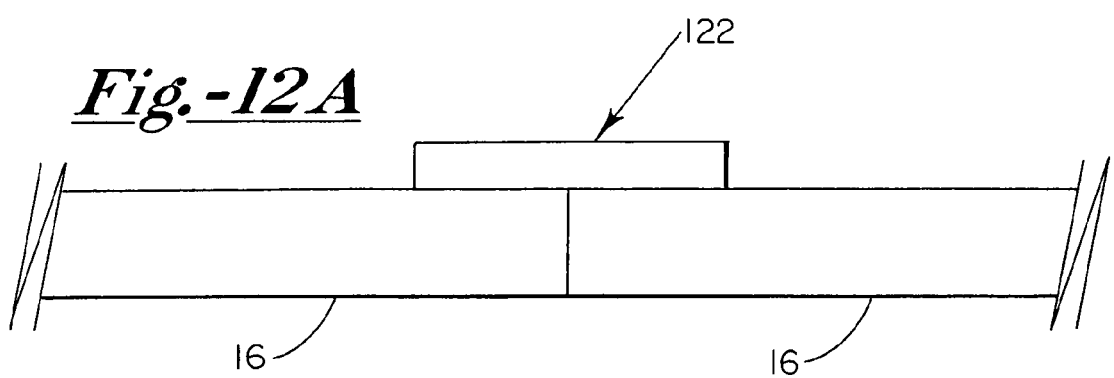

FIG. 12A is a diagrammatic view of a butt type of connection for engagement of end portions of sheathing so as to provide for a tortuous path for fluid such as air and moisture.

Figure 12B:
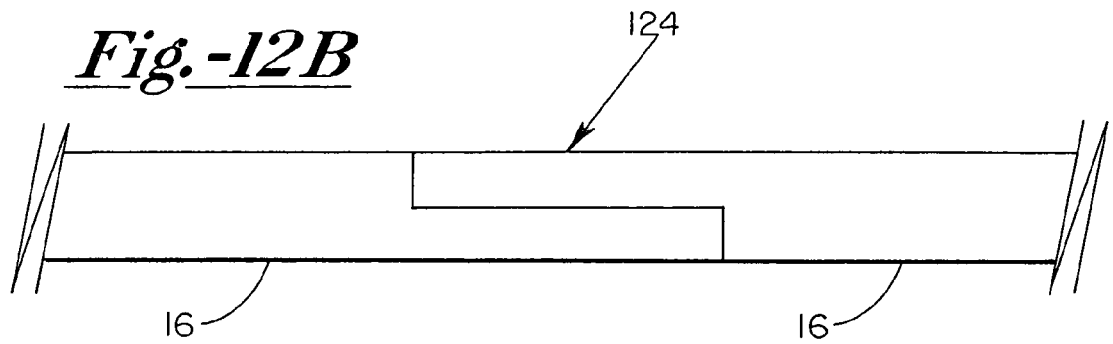

FIG. 12B is a diagrammatic view of a shiplap type of connection for engagement of end portions of sheathing so as to provide for a tortuous path for fluid such as air and moisture.

Figure 13A:
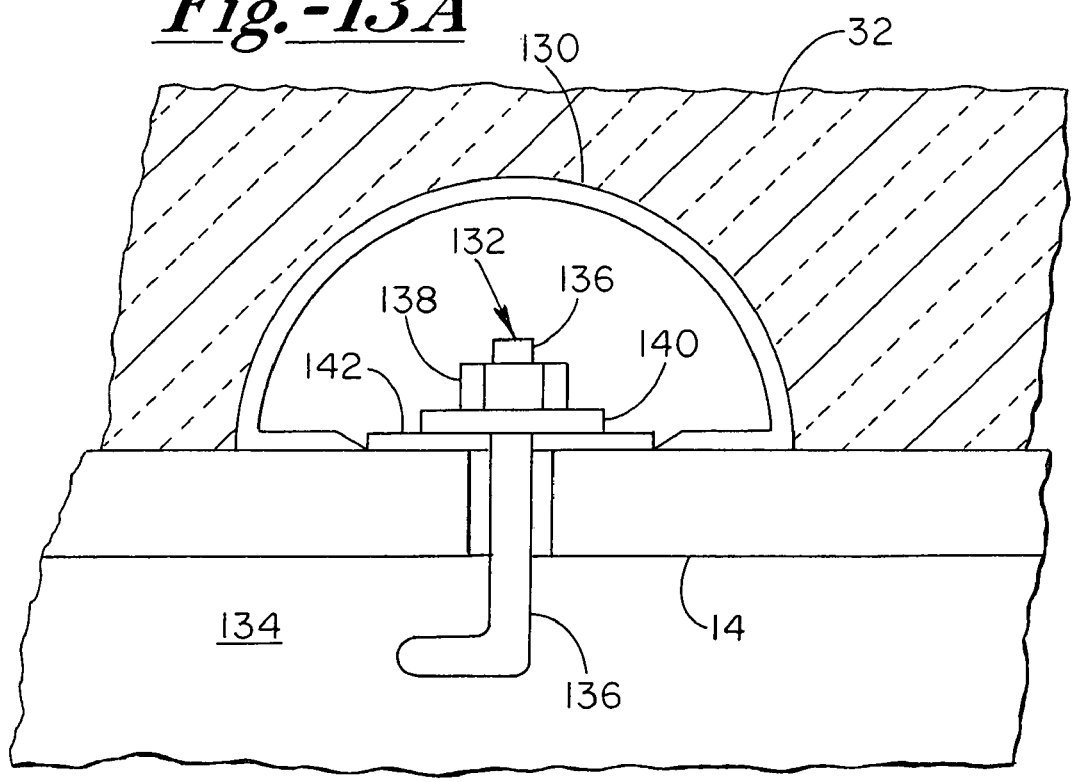

FIG. 13A is a diagrammatic view of how one peripheral of a stud panel can be isolated from insulation via an isolator, particularly of how a fastener for one of the first and second plates can be isolated from insulation.

Figure 13B:
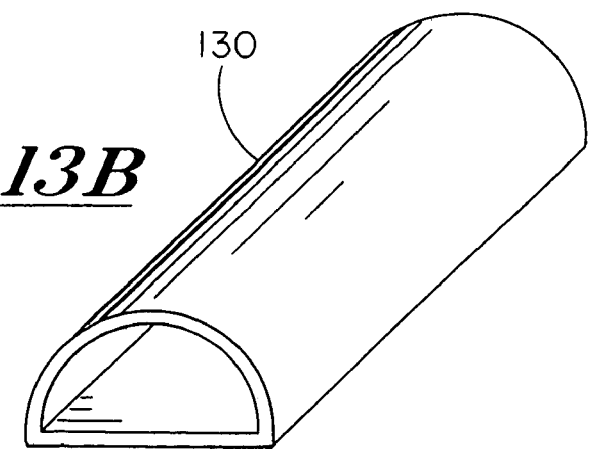

FIG. 13B is a perspective view of the isolator of FIG. 13B.

Figure 14A:
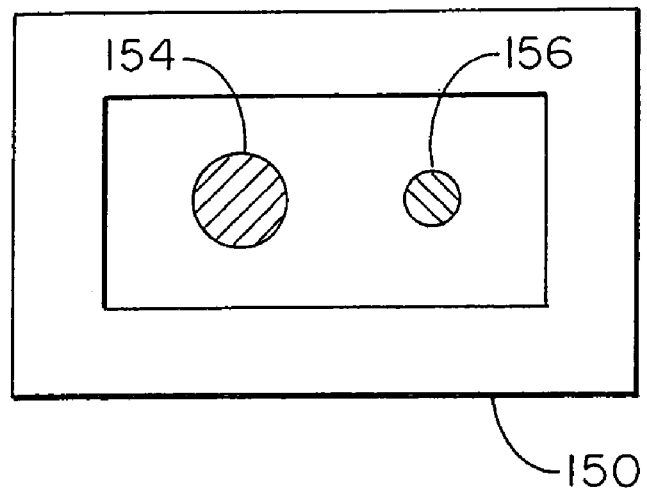

FIG. 14A is a section view of one embodiment of a stud of the stud panel of the present invention, showing how selecting a tubular stud or a stud with a hollow cavity can be utilized to isolate a peripheral, such as electrical wire, from insulation in the stud panel.

Figure 14B:
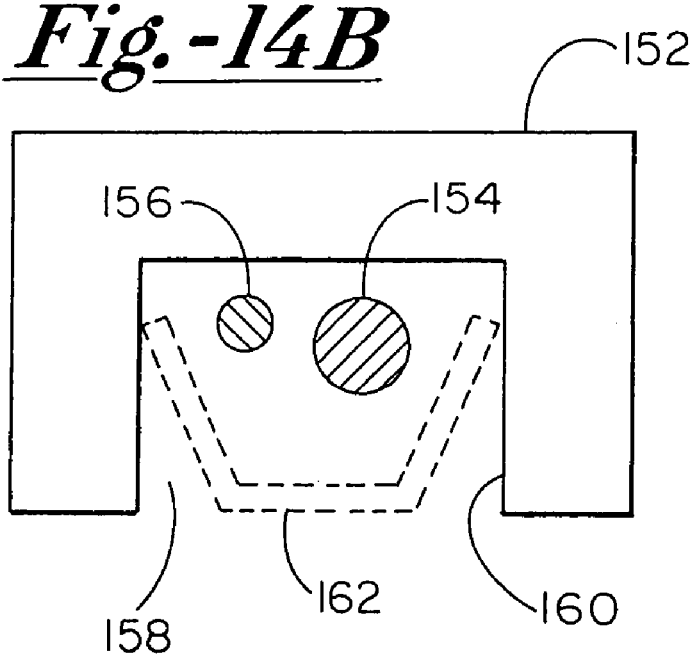

FIG. 14B is a section view of one embodiment of a stud of the stud panel of the present invention, showing how selecting a U-shaped or channel stud can be utilized to isolate a peripheral, such as electrical wire, from insulation in the stud panel.

Figure 15:
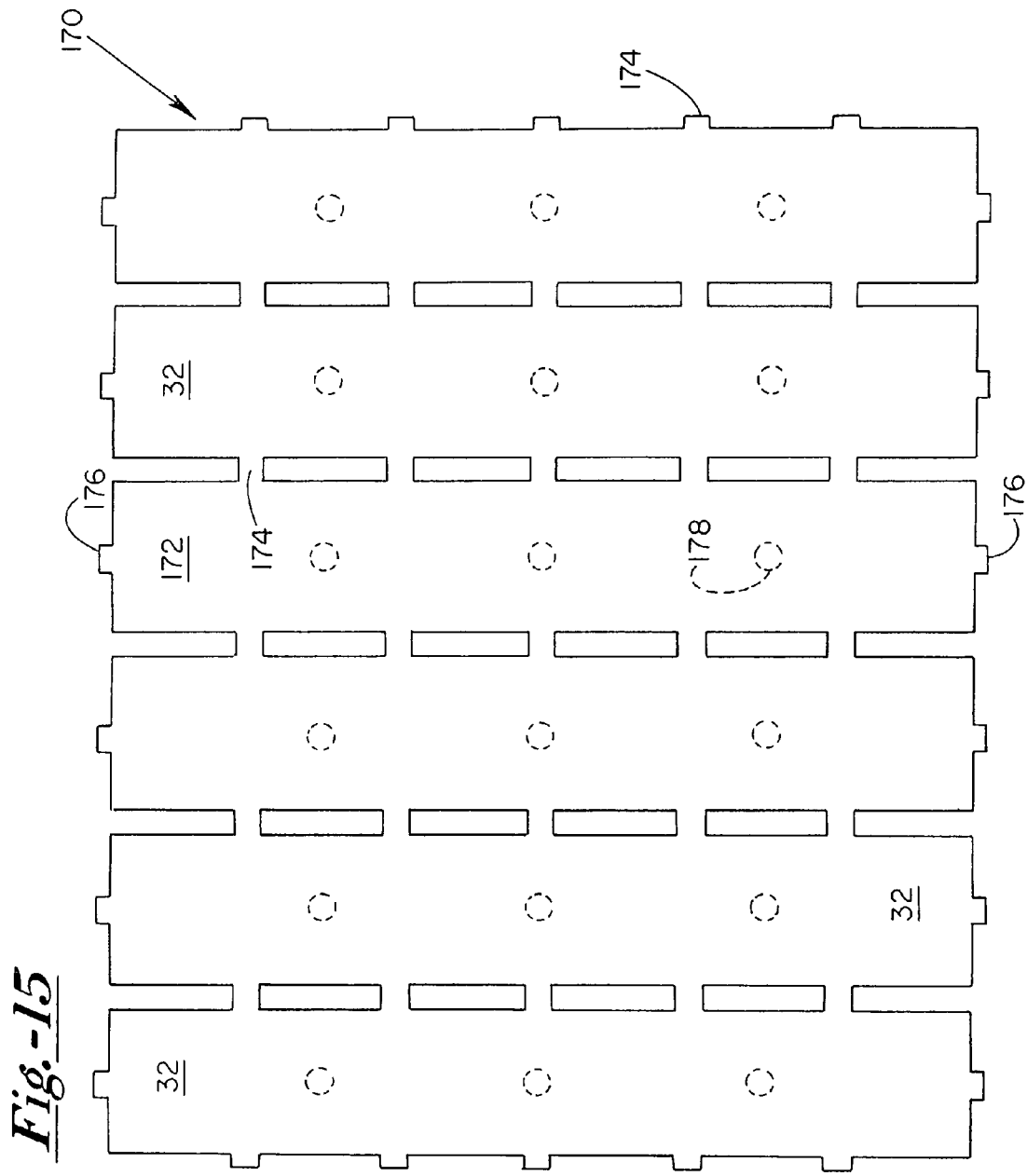

FIG. 15 shows a diagrammatic view of an inner cast formed of insulation of the stud panel of FIG. 5, where the inner cast, and integral extensions, extend in the x, y, and z directions.

Figure 16:
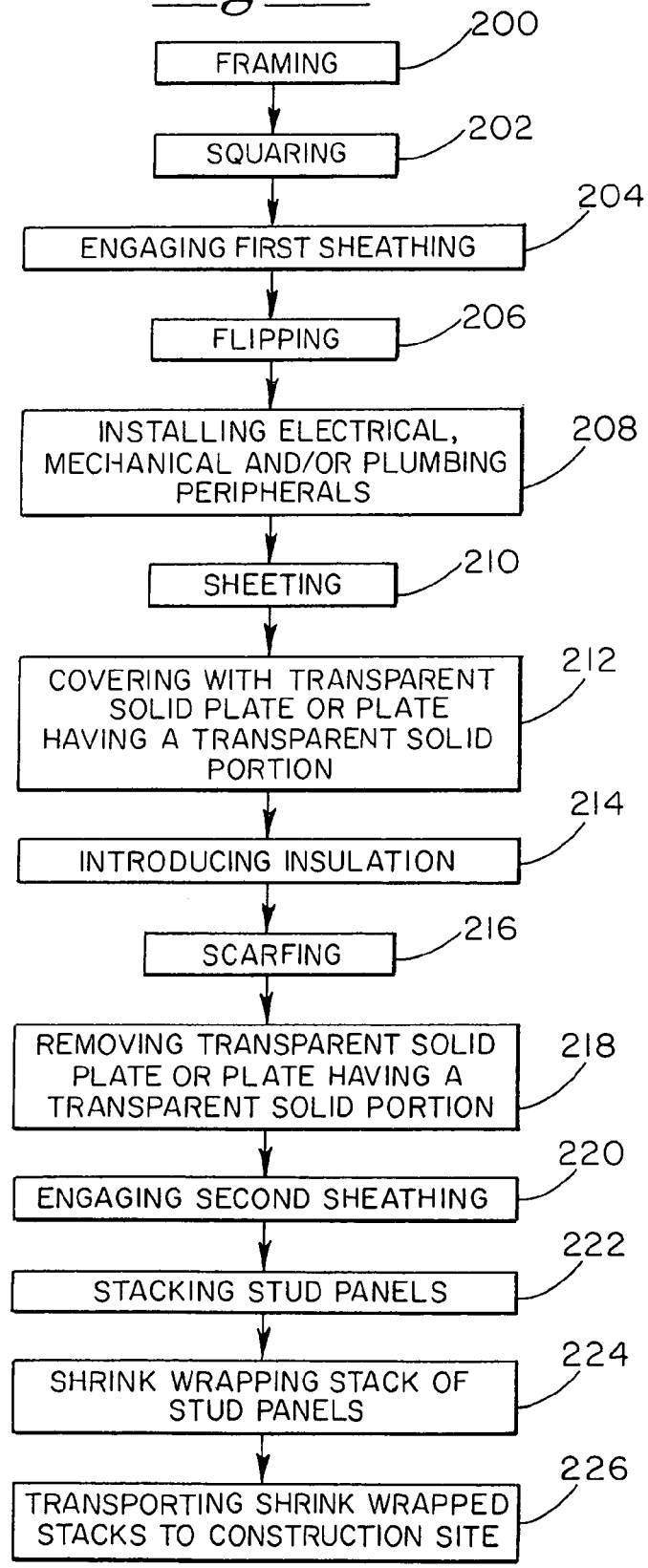

FIG. 16 is a flow chart for a method of making a stud panel of the present invention.

Figure 17:
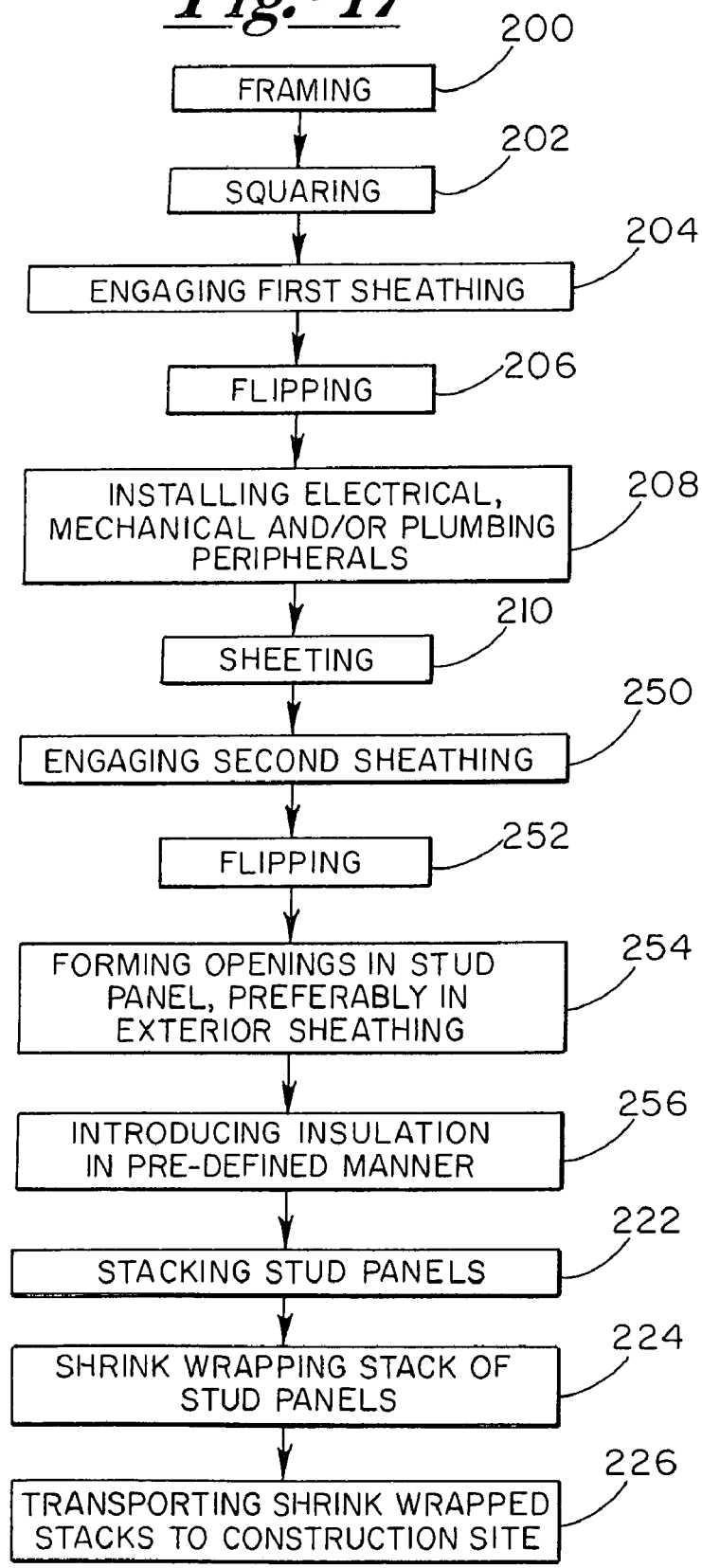

FIG. 17 is a flow chart for an alternate method of making a stud panel of the present invention.

Figure 18:
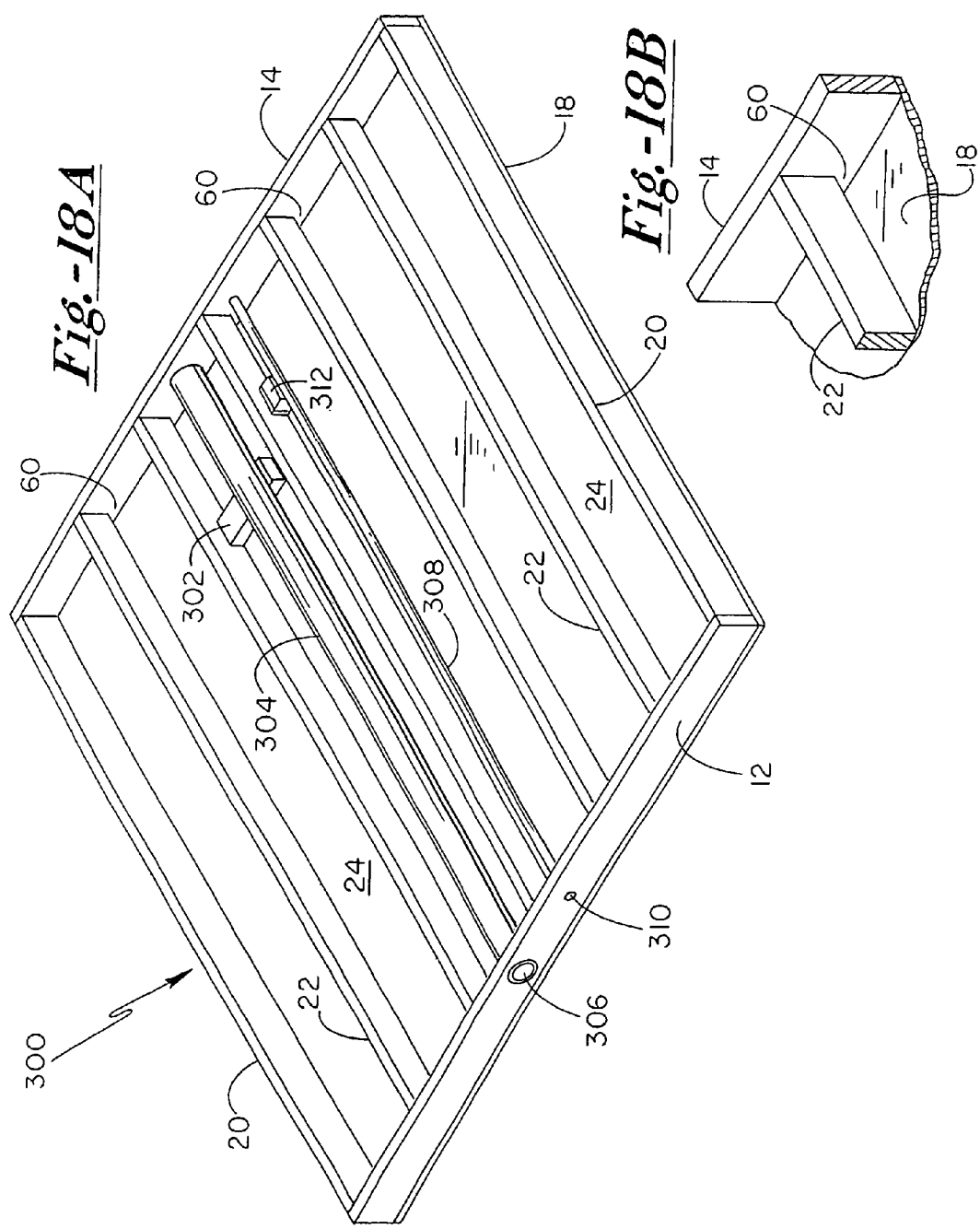

FIG. 18A is a perspective view of an alternate embodiment of the present stud panel being prepared for insulation being blown onto and into the panel.

FIG. 18B is a perspective detail view of a portion of the panel of FIG. 18A to show one of the thermal breaks of the panel of FIG. 18A.

Figure 19:
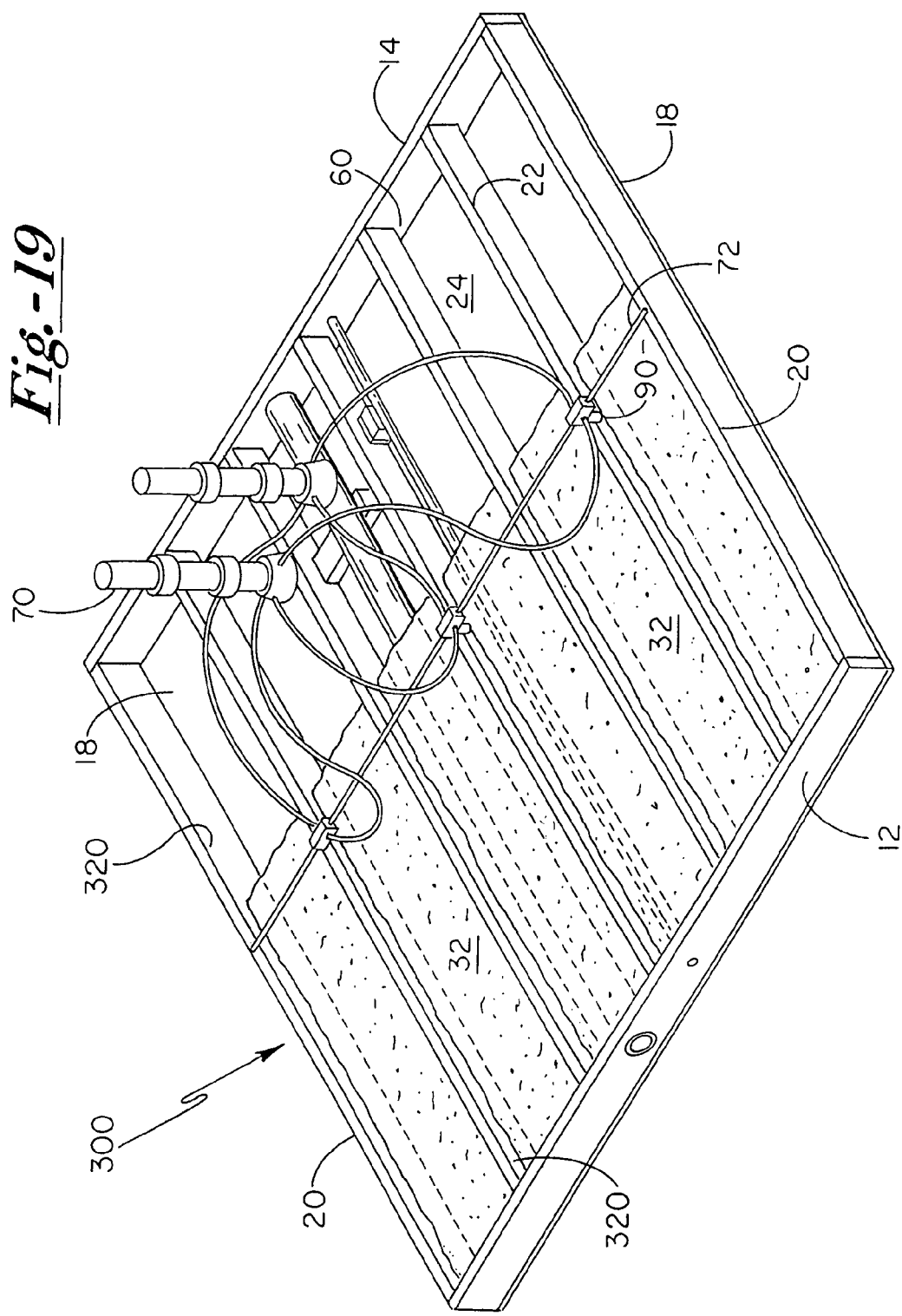

FIG. 19 is a perspective view of the panel of FIG. 18A having insulation automatically blown onto and into the panel.

Figure 20:
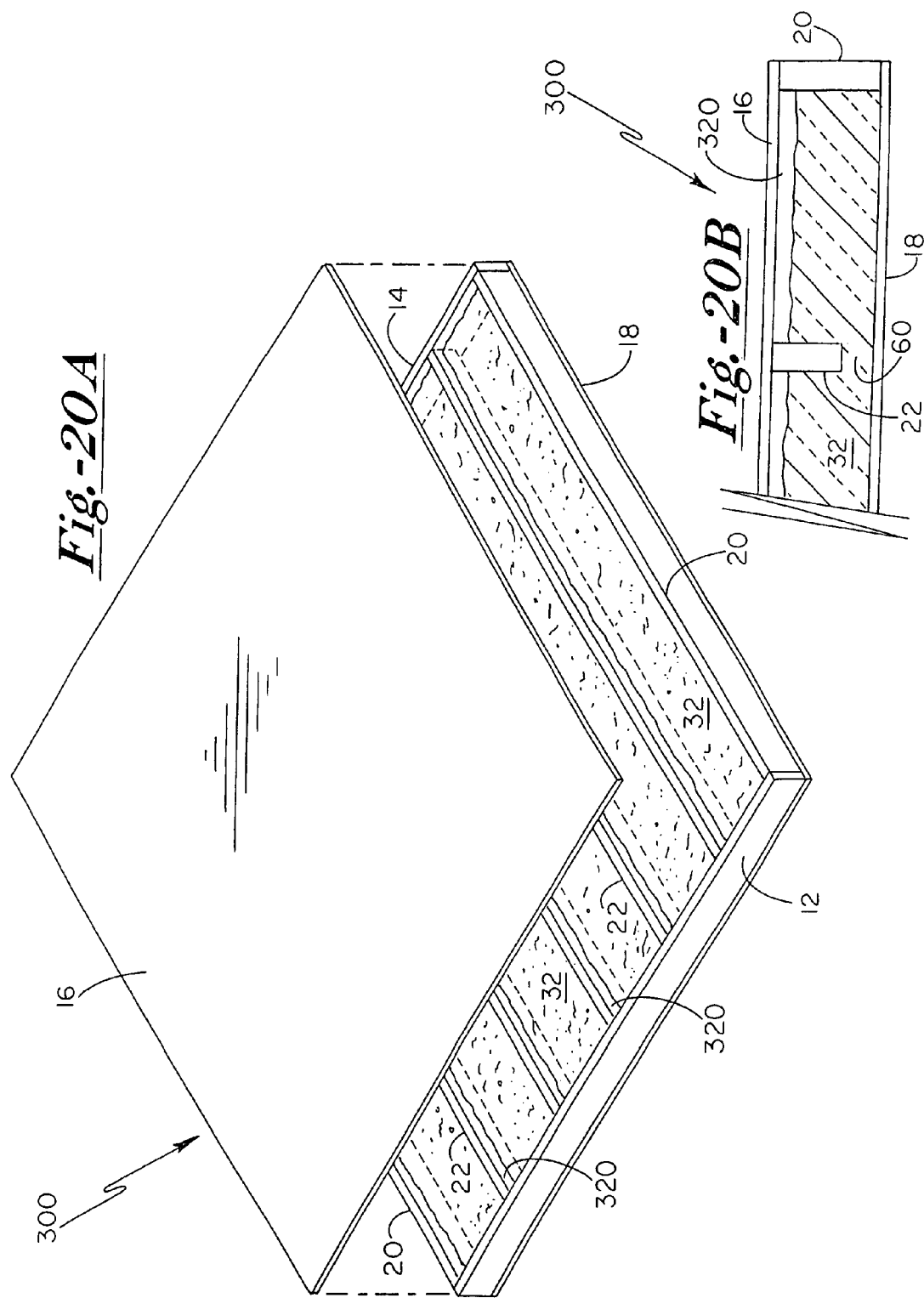

FIG. 20A is a perspective view of the panel of FIG. 19 having exterior sheathing being engaged thereto, such as by nailing, after insulation has been blown into the panel.

FIG. 20B is a section view of a portion of the panel of FIG. 20A where the panel includes insulation blown up to and on the interior sheathing and terminating short of the exterior sheathing.

Figure 21:
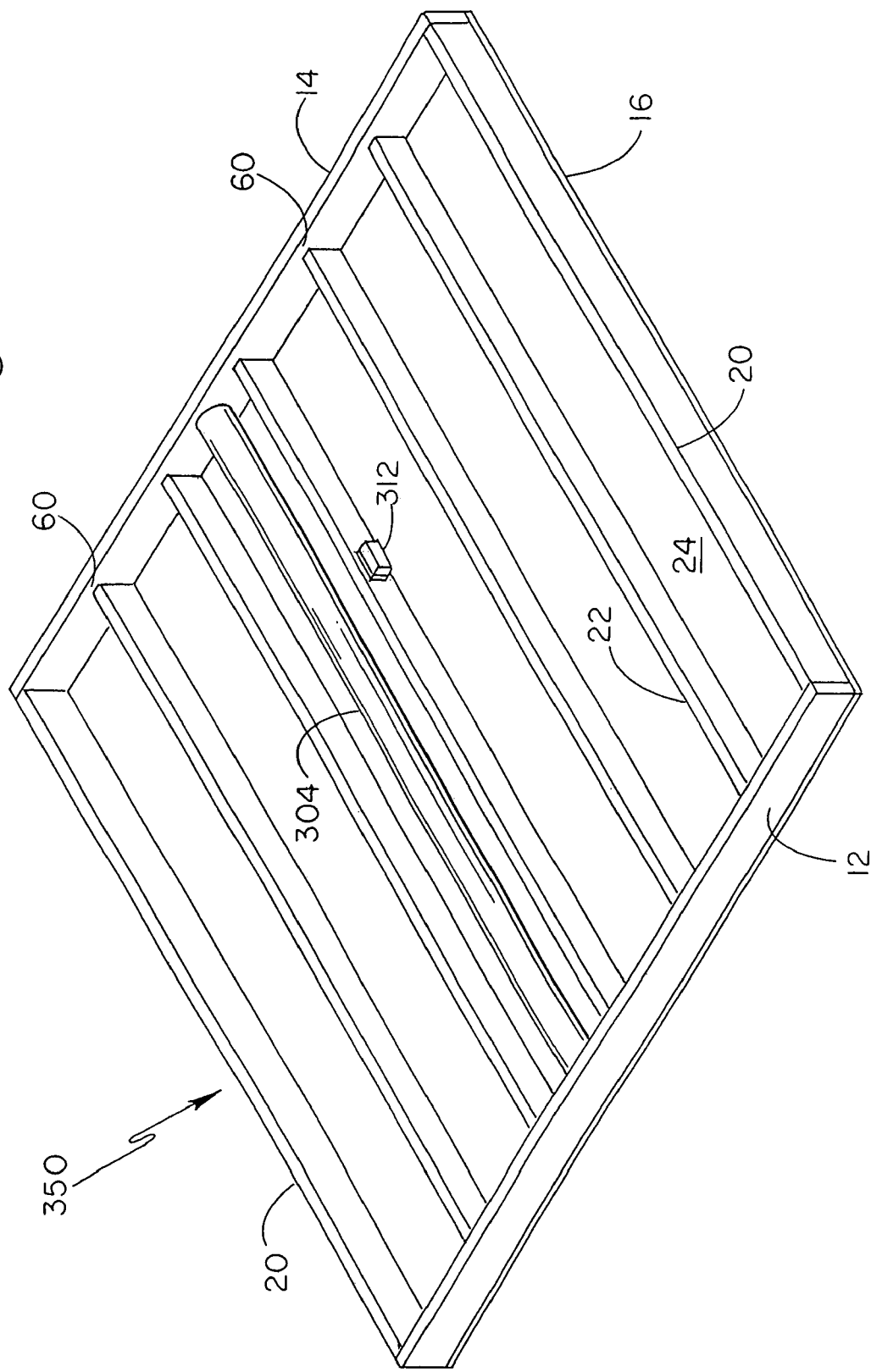

FIG. 21 is a perspective view of an alternate embodiment of the present stud panel being prepared for insulation being blown onto and into the panel.

Figure 22:
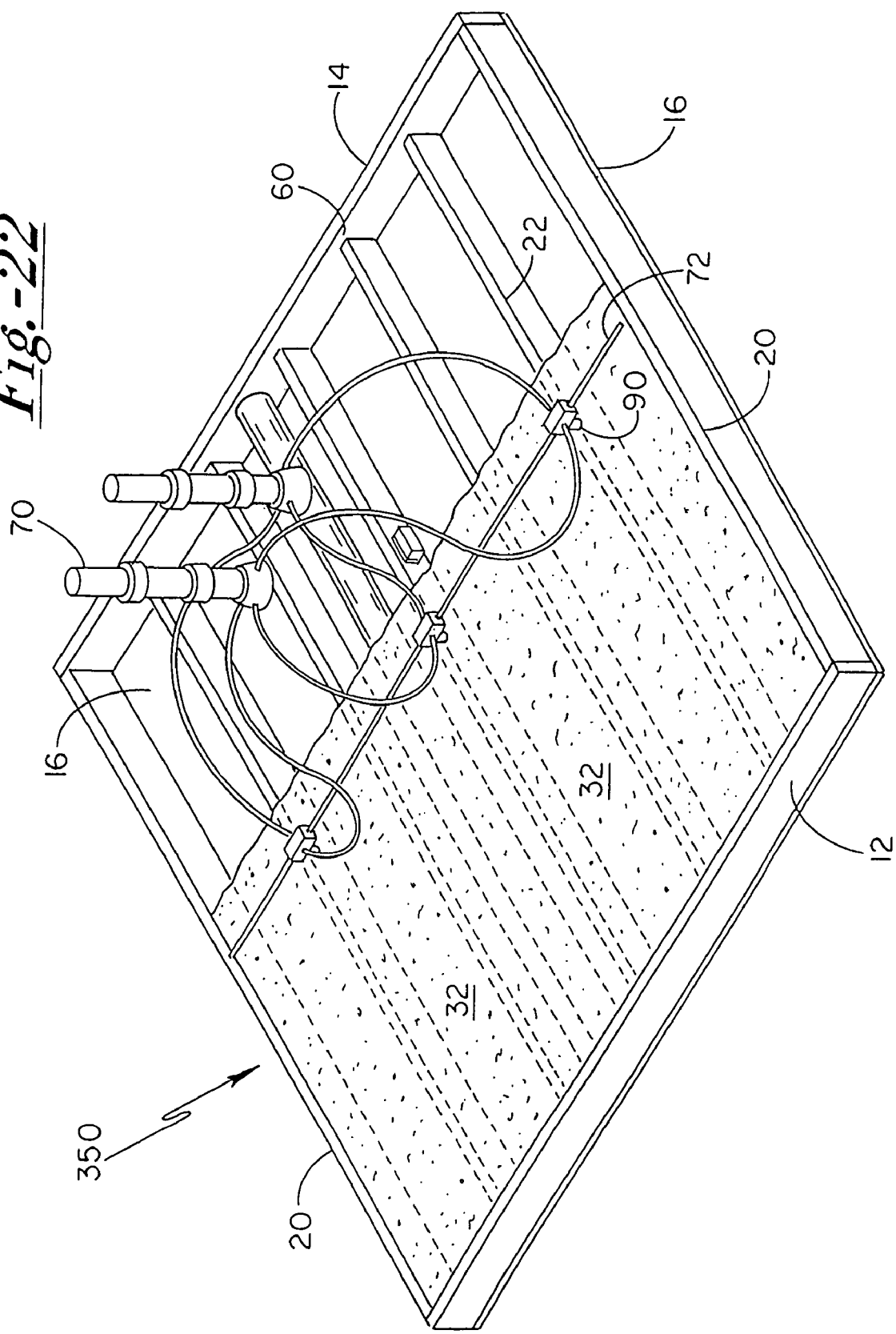

FIG. 22 is a perspective view of the panel of FIG. 21 having insulation automatically blown onto and into the panel.

FIG. 23 is a perspective view of the panel of FIG. 22 having interior sheathing being engaged thereto, such as by gluing, after insulation has been blown into the panel and after such insulation has been trimmed or scarfed.

DESCRIPTION OF THE PREFERRED EMBODIMENT

Figure 1:
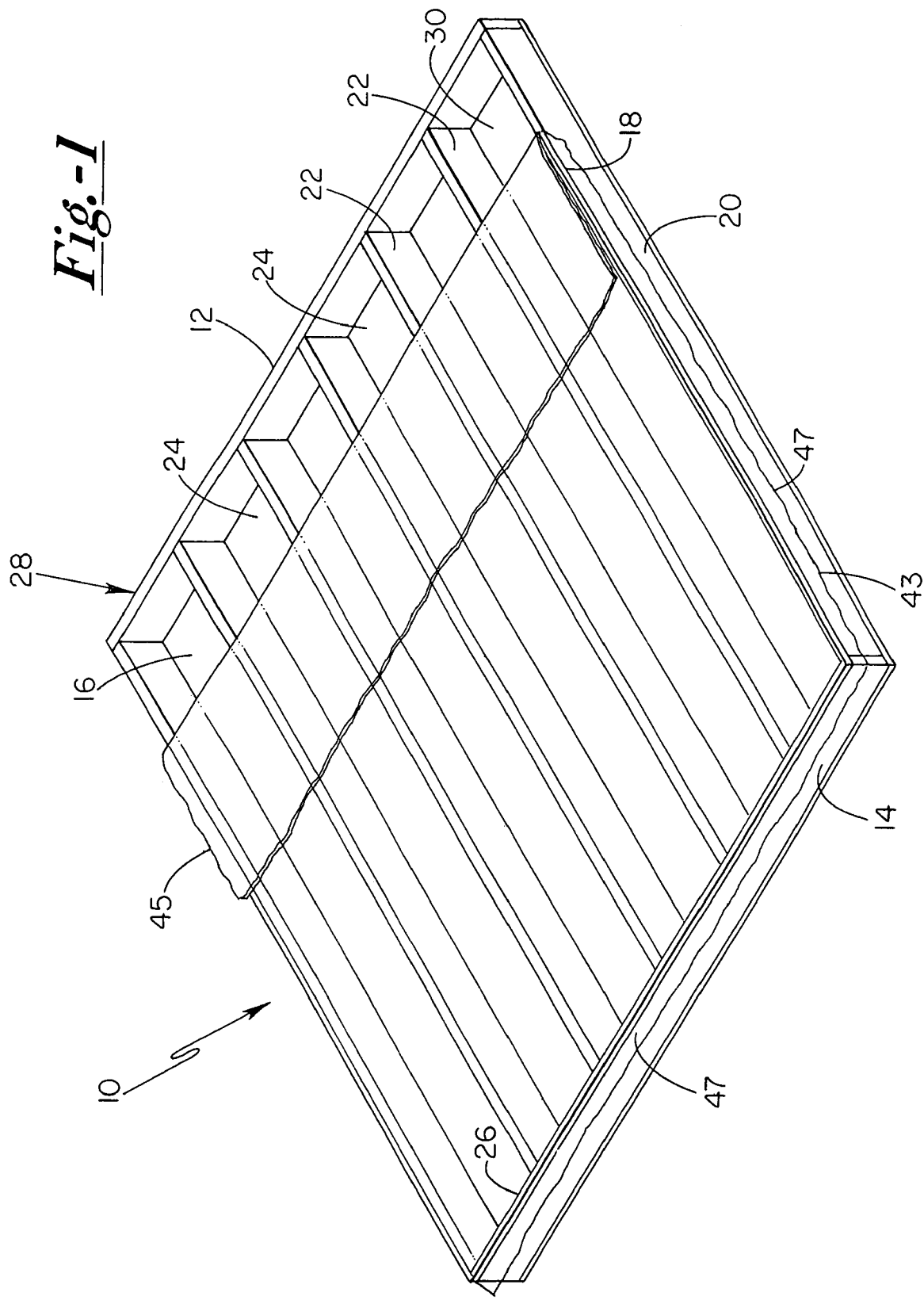
FIG. 1 shows a perspective view of a stud panel of the present invention having temporary interior sheathing prior to insulation being introduced into inner regions of the stud panel.

FIG. 1 shows a stud panel 10 of the present invention. Stud panel 10 includes a first, top (or bottom) plate 12, a second, bottom (or top) plate 14, exterior (or interior) sheathing 16, interior (or exterior) sheathing 18, a pair of end or outer studs 20, and a set of interior or inner studs 22, where studs 20 and 22 are between the first and second plates 12, 14 and further between the exterior and interior sheathing 16, 18. The stud panel 10 includes a set of inner regions or spaces 24, where each of the inner regions 24 is defined by inner faces of the first and second plate 12, 14, inner faces of the exterior and interior sheathing 16, 18, and inner faces of adjacent studs, where such adjacent studs are a combination of an outer stud and inner stud or a combination of two inner studs. Each of the inner regions 24, in the panel of FIG. 1, includes a closed end 26, into which insulation can be first introduced, and an open end 28, into which insulation can be introduced as a subsequent or final step. The stud panel 10 includes a width direction defined as the direction between the exterior and interior sheathing 16, 18. The stud panel 10 includes a length direction defined as the direction between outer studs 20. The stud panel 10 includes a height direction defined as the direction between first and second plates 12, 14.

The interior sheathing 18 shown in FIG. 1 is a temporary sheathing or retainer formed of a plastic see-through or transparent material such as Plexiglas® such that insulation introduced into inner regions of the stud panel 10 can be visually tracked. The interior sheathing 18 includes a generally straight edge 30 spaced from first plate 12 so as to form the open ends 28 of the elongate inner regions 24. Exterior and/or interior sheathing 16, 18 can cover at least a portion of the outer and inner faces of the stud panels of the present invention and can, if desired, cover the entire faces of the panels.

Figure 2:
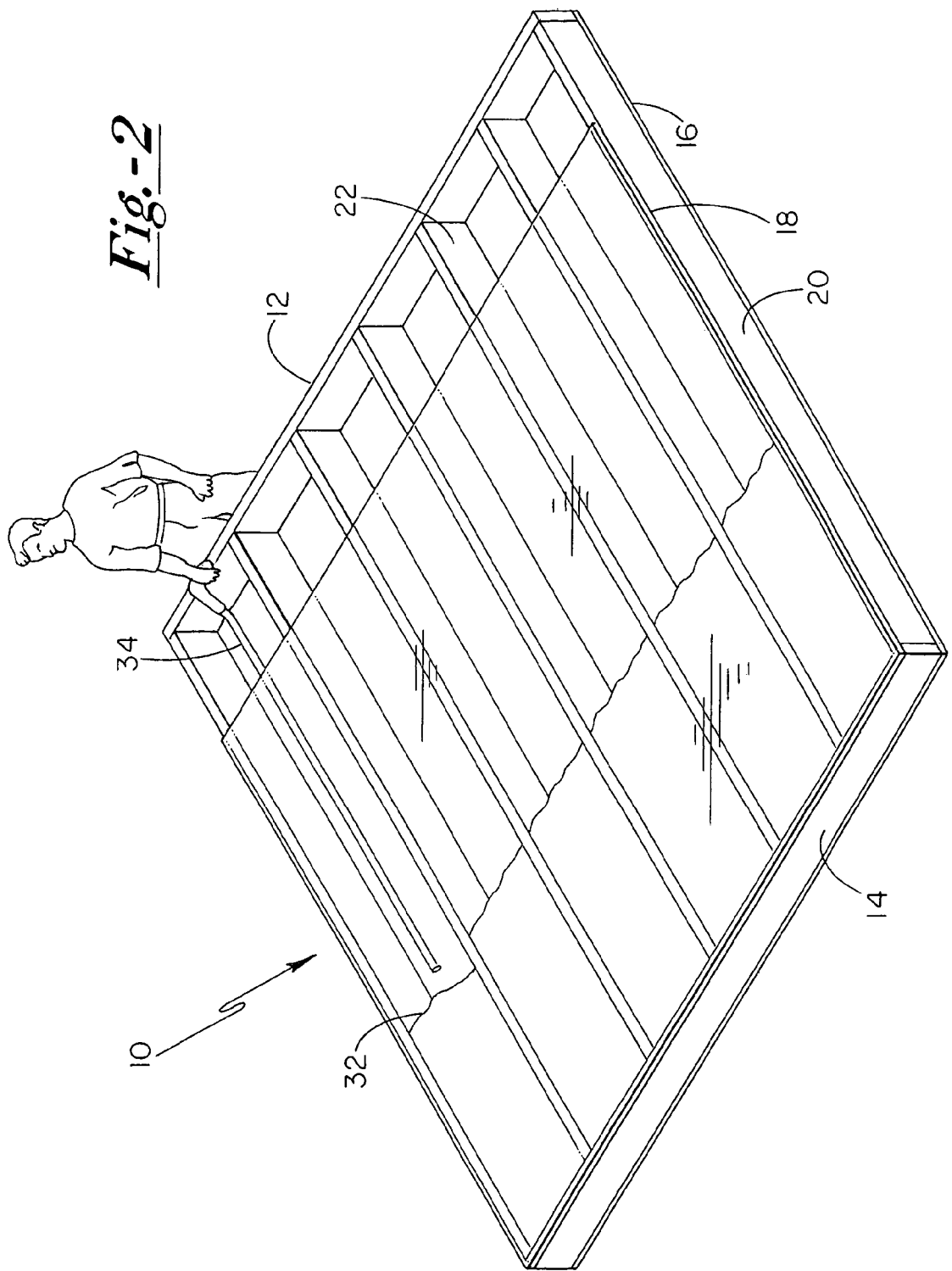
FIG. 2 shows a perspective view of the stud panel of FIG. 1 with insulation being introduced into inner regions of the stud panel from a closed end of an inner region to an open end of the inner region.

FIG. 2 shows the stud panel 10 of FIG. 1 having insulation 32 being introduced therein. The insulation 32 may be blown in via a spray gun, or a spray gun having a hose or wand attachment 34. Insulation is first introduced into the closed end 26 and then, as the hose attachment 34 is withdrawn, the insulation is introduced incrementally along the selected inner region 24 to and, if desired, beyond the open end 28 so as to overfill open end 28 so as to in turn minimize any empty space in the inner region 24 after the insulation 32 is scarfed or trimmed. After filling one inner region 24, the hose attachment 34 is fed into the open end 28 of another inner region 24, through the inner region 24, and to the closed end 26, whereupon the spray gun may be activated so as to first introduce the insulation 32 into the closed end 26, then incrementally blow the insulation toward the open end 28, and then into the open end 28. Such a method is repeated in each of the inner regions 24 until the stud panel 10 is substantially completely filled with the insulation 32. It should be noted that the wand attachment 34 is preferably heated along its entire length to the temperature at which the hoses, leading from insulation component storage, are heated. It should be noted that the wand attachment may not be used. Instead, the nozzled spray gun alone is held in the open end 28 and perhaps moved slightly under the pressure plate 18 to ensure that at least the nozzle is under the pressure plate 18.

Figure 3:
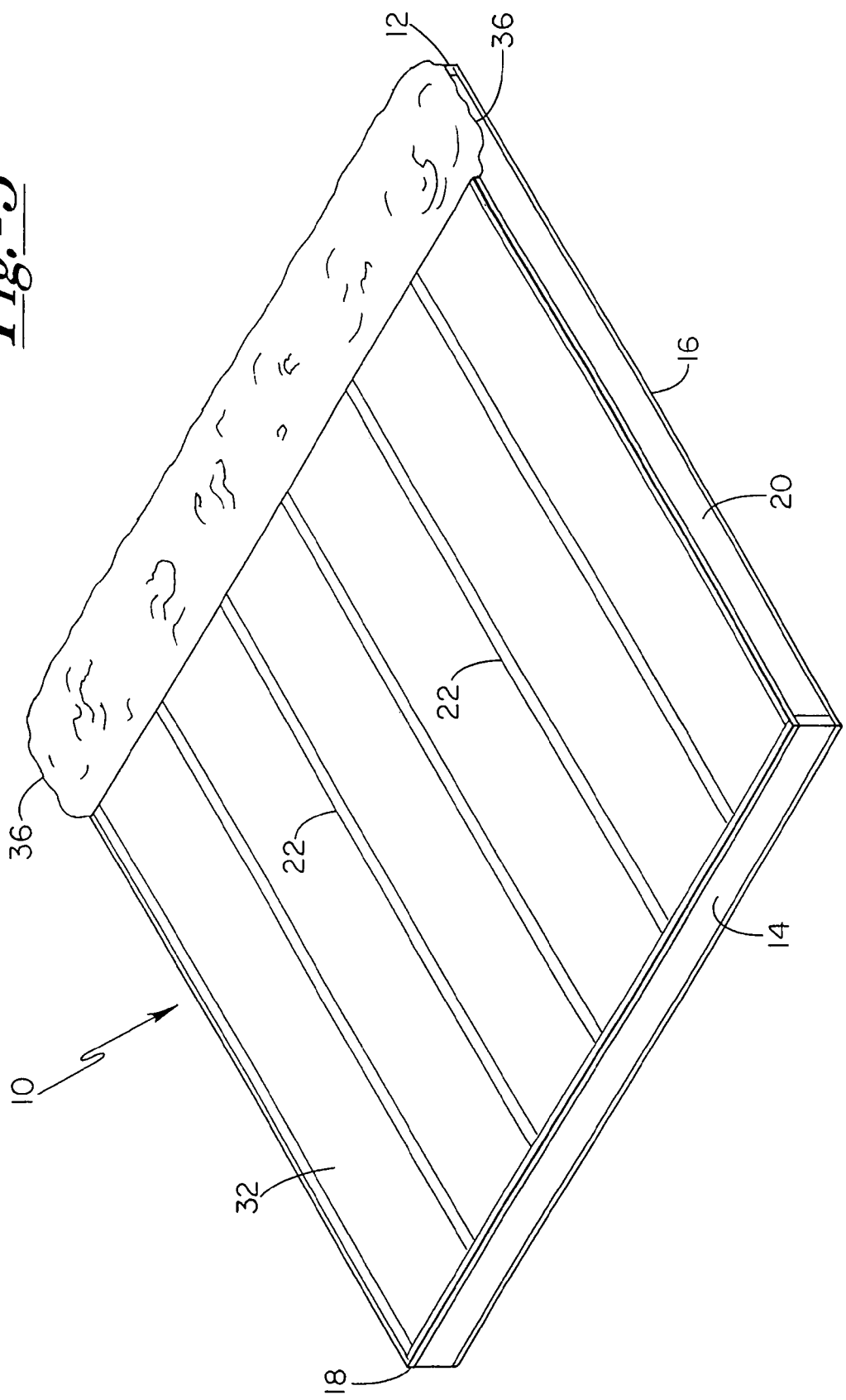
FIG. 3 shows a perspective view of the stud panel of FIG. 2 where insulation has been fully introduced in the inner regions of the stud panel and where excess insulation has protruded from or has expanded from open ends of the inner regions of the stud panel.

FIG. 3 shows insulation overage 36. The insulation overage or protruded or excess insulation 32 extends in the length direction of the stud panel across the open ends 28 of the inner regions 24. Depending upon the type of insulation used, such insulation overage 36 may have expanded to such a position or may have intentionally been sprayed to such an overage condition such that it can be certain that all empty spaces in the inner regions 24 have been filled with the insulation 32.

Figure 4:
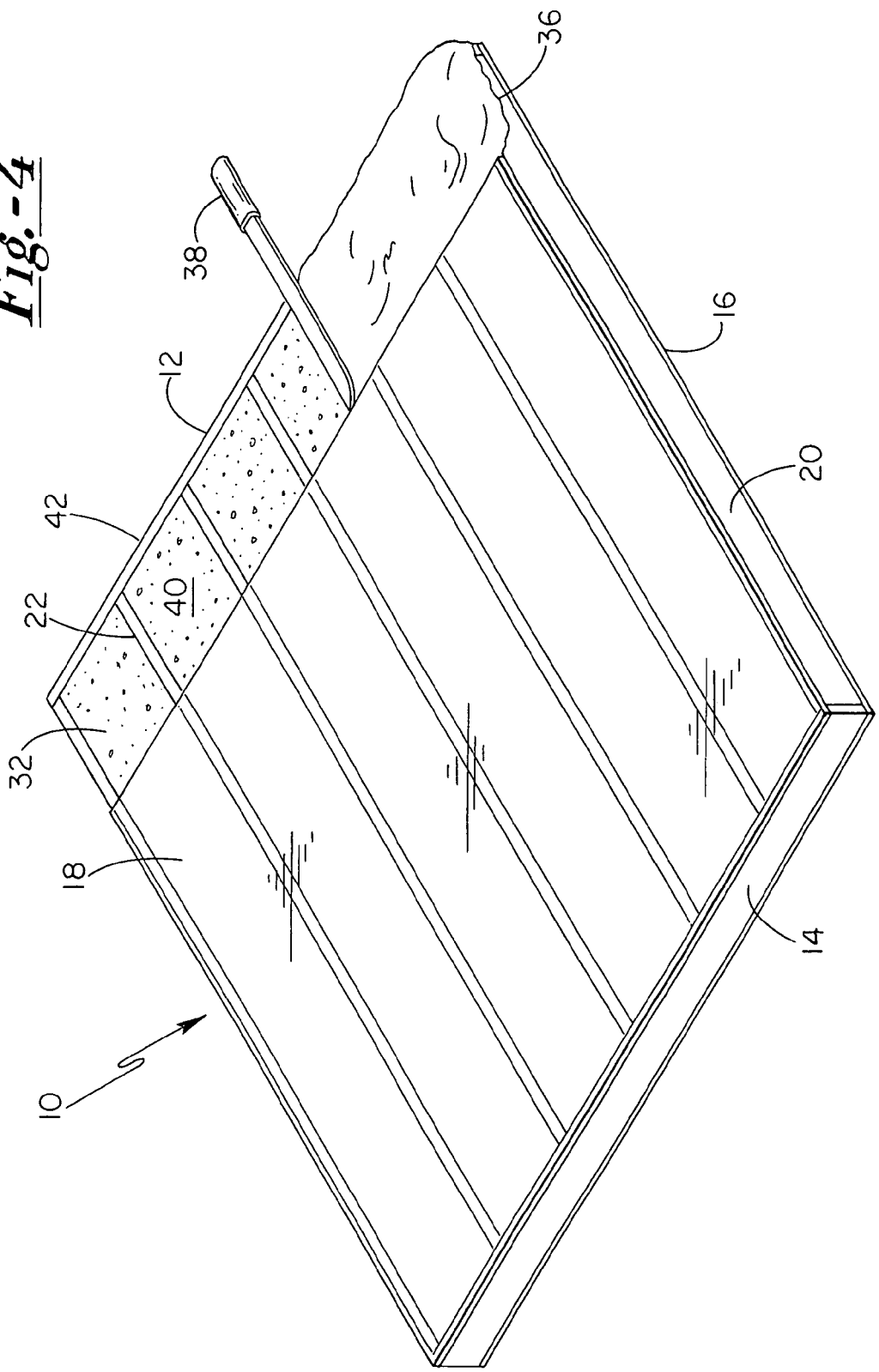
FIG. 4 shows a perspective view of the stud panel of FIG. 3 wherein the excess insulation is being scarfed or trimmed from the open ends of the inner regions.

FIG. 4 shows the insulation overage 36 being scarfed with a knife or other blade or heated wire instrument 38 so as to produce a flat face 40 to the insulation 32 at the open ends 28. The scarfed produced flat face 40 is substantially coplanar with an inner face of the interior sheathing 18. An edge 42 of first plate 12 can be used as a guide for the blade of the instrument 38 as the edge 42 is substantially coplanar with the inner face of the interior sheathing 18. The step of scarfing preferably runs from an outermost open end 28 to the opposite outermost open end 28 such that the flat face 40 runs to and between the outermost open ends 28 and to and between the outer studs 20.

Subsequently, after the step of scarfing or if desired prior to the step of scarfing, temporary sheathing 18, shown in FIGS. 1 to 4, can be removed so as leave a flat face 40 running fully between first and second plates 12, 14 and running fully between outer studs 20. Depending upon the type of insulation used, a nonstick or release agent or interface or isolator can be utilized on the inner surface of sheathing 18 where such nonstick agent minimizes any bond being formed between the interior sheathing 18 and the type of insulation used. The nonstick or release agent or isolator may be a natural oil such as a vegetable or peanut oil or a hydrocarbon oil or a synthetic fluid such as a spray on PTFE fluid. The nonstick release agent is preferably an alcohol or alcohol-based agent. More preferably the nonstick release agent is or includes glycerin or is glycerin-based. An interface or isolator may be an inexpensive paper or sheet of plastic, which remains with the insulation 32 or which is drawn off with the temporary sheathing 18. Such a sheet of plastic may be a sheet of clear or transparent plastic 43 required by code and shown in FIG. 1 (but not reproduced in FIGS. 2–6 for clarity). Sheet or sheeting 43 can be of a size sufficient to cover the fully open face of the stud panel 10, with a portion 45 rolled back so as to expose openings or open ends 28 and with the remaining portion 47 pinched between the temporary sheathing or pressure plate 18. The rolled or folded back portion 45 is then engaged over open ends 28 after spraying insulation 32 in the inner regions 24 and after scarfing the excess insulation 32 from open ends 28.

It should be noted that the interior sheathing 18 shown in FIGS. 1–4 can be a permanent sheathing that remains on stud panel 10. In such a case, a further section of permanent sheathing, such as sheet rock, can be engaged over the row of open ends 28. It should be noted that the row of open ends 28 may be located next to the first, top plate 12 or next to the second, bottom plate 14.

FIG. 5 shows an alternate embodiment of the present stud panel. Here a stud panel 50 includes one or more openings 52 in exterior sheathing 16 (or interior sheathing 18), one or more openings 54 in one or more of the inner studs 22, one or more openings 56 in one or more of the first and second plates 12, 14, and one or more openings 58 in one or more of the outer studs 20. The insulation 32 can be introduced into one or more of the openings 52, and/or into one or more of the openings 56 in the first and second plates 12, 14, and/or into one or more of the openings 58 in the outer studs 20. Preferably the insulation 32 is introduced into one or more of the openings 52 of the exterior sheathing 16, with such insulation then subsequently being indirectly introduced or expanding into through-openings 54, and with such insulation subsequently indirectly being introduced or expanding into through-openings 56 and 58. As insulation is flowing into and through the openings 54, 56 and 58, pressure is being relieved from the inner regions 24 in which the insulation or foam is expanding or trying to expand; pressure is also building in the inner regions 24 so as to force the insulation or expanding foam 32 fully into inner regions 24. The amount and size of openings 52, 54, 56, and 58 depend, for example, upon the type of insulation used, the temperature of the insulation, the temperature and humidity of the environment in which the stud panel 50 is being fabricated, the flow rate at which the insulation 32 is being fed into the openings 52, the total volume of the inner regions 24, and the structure and size of the stud panel 50.

Stud panel 50 also shows inner studs 22 terminating short of the interior sheathing 18. In other words, one normally vertical face of inner stud 22 confronts the exterior sheathing 16 and the opposite normally vertical face of inner stud 22 is spaced from interior sheathing 18 so as to form an elongate normally vertically extending space or thermal break 60. In still other words, inner studs 22 are offset to the exterior sheathing 16 and offset from the interior sheathing 18. Space or thermal break 60 is filled with insulation 32 as the insulation 32 is fed through the openings 52 and flows through openings 54, 56 and 58. Accordingly, the insulation 32, after drying or setting or curing, is integral and one-piece throughout the stud panel 50 such that an insulation structural interlock is formed throughout the stud panel 50. Depending upon the type of insulation utilized, such an insulation interlock can be the sole means of engagement between one or more of first plate 12, second plate 14, exterior sheathing 16, interior sheathing 18, outer studs 20 and inner studs 22. Openings 52, 54, 56, and 58, as well as thermal breaks 60, can 1) allow for expansion of the insulation 32, 2) provide an insulation interlock, 3) provide for a running of isolators or secondary devices and apparatus such as conduits. Openings 52, 54, 56 and 58, combined with thermal breaks 60, can run in one or more of the height direction, the length direction, and the width direction of any of the present stud panels, thereby providing insulation locks in one or more of such height, length and width directions (generally, "x, y, and z" directions).

FIG. 5 further shows a conduit 62, such as a polyvinyl chloride (PVC) electrical conduit or 16 gage, thin gage or other metal conduit, running between the outer studs 20. Conduit or isolator 62 is tubular through which electrical wires can run in a manner isolated from insulation, particularly insulation being blown in. Conduit 62, and other peripheral isolators, are preferably fixed in place prior to insulation 32 being blown into stud panel 50 (or stud panel 10). Reference number 64 indicates another peripheral, such as an electrical box 64, engaged for example by gluing to the interior sheathing 18. Alternatively, it should be noted that conduit 62 may be a nail base, such as a wooden base, running in a lengthwise direction between outer studs 20, and to which peripherals, such as an electrical box, can be fixed with pin connectors.

It should be noted that stud panel 50 can include "2 by 6" studs as the outer studs 20 and "2 by 4" studs as the inner studs 22 so as to provide the thermal break 60.

FIG. 6 shows an apparatus 70 for automatically introducing the insulation 32 into the stud panel 50. Apparatus 70 includes a rail or nozzle carrier 72. Rail 72 preferably extends in the height direction and can move in the lengthwise direction from one inner region 24 to the adjacent inner region 24 and beyond. A set of nozzle assemblies 74 run along the rail 72. Each of the nozzle assemblies 74 can run independently of the other nozzle assemblies on the same rail 72 or can be controlled to run as a set. Such control can be, for example, actuated via a wireless control mechanism. Fluid, agents, reactants, ingredients, precursors and other materials for forming insulation 32 and other products can flow to and/or from the nozzle assemblies 74 via lines 76, which lines may be, as to one nozzle assembly 74 at one or more times, a) an input line and an output line, b) an input line and an input line, or c) an output line and an output line. Proximal portions of lines 76 may be communicate with one or more assemblies A and B. Each of assembly A and B can include one or more of a one way valve 78, one or more of a purge assembly 80, and one or more of a distributor 82.

FIG. 7 shows that apparatus or delivery system 70 can include a control 84, such as a processor or personal computer, that may respond to and/or control one of more of a temperature of material precursors for the insulation 32 or a temperature of the insulation 32 in a foam form or other form, a pressure of material precursors for the insulation 32 or a pressure of the insulation 32 in a foam form or other form, and a volume of material precursors for the insulation 32 or a volume of the insulation 32 in a foam form or other form. Control 70 can also automatically, with preset parameters, operate a nitrogen purge 80 and control flow of fluid via one or more distributors 82.

FIG. 8 shows that a nozzle 90, engaged to a nozzle assembly 74, can be controlled or pivoted via an extension rod of an air cylinder 91 such that a fan pattern 92 can be formed as the foam 94 is being sprayed over a length direction of the inner region 24. It should be noted that alternatively a nozzle on nozzle assembly 74 can be structured or can have a particular nozzle tip, such that the fan pattern 92 can be formed with the insulation or foam 94 as such insulation 32 exits the nozzle tip of the nozzle 90. If desired, a "cannon" type of spray may also be utilized. A "cannon" type of spray is preferred when manually blowing insulation into the closed end 26, as shown in FIG. 1.

FIGS. 9A and 10A show a stud panel 100 having inner studs 22 extending to each of the exterior and interior sheathing.

FIGS. 9B and 10B show a stud panel 102 having inner studs 22 confronting the interior sheathing 18 and being spaced from the exterior sheathing 16 so as to form a thermal break 60 between inner studs 22 and exterior sheathing 16.

FIGS. 9C and 10C show a stud panel 104 having inner studs 22 confronting each of the exterior and interior sheathing 16, 18, where each of the inner studs also are spaced from each of the exterior and interior sheathing 16, 18, so as to create a thermal break 60 between each of the pairs of inner studs 22.

FIGS. 9D and 10D show a stud panel 106 having inner studs 22 confronting the exterior sheathing 16 and being spaced from the interior sheathing 18 so as to form a thermal break 60 between inner studs 22 and interior sheathing 18. FIG. 9D further shows electrical conduit or nail base 62.

FIG. 11 shows how adjacent stud panels, such as stud panels 10, 50, 100, 102, 104, and 106 can be adjusted relative to each other in the length direction and then tied together via a key stud arrangement 110 whereby shrink and growth issues of a wall structure can be resolved. The key stud arrangement 110 includes a pair of studs 112 and a key stud 114 having a seal 116 engaged on one face of the key stud 114. Seal 116 may be a resilient seal formed of an open or closed cell foam. Each of the studs 112 is engaged to one outer stud 20 and a sheathing edge of one stud panel. Stud 112 is about the height of stud 20. If desired, stud 112 can be the height of stud 20 plus the height of the thickness of first plate 12 plus the height of the thickness of second plate 14. Stud 114 and seal 116 can be the height of stud 112. In operation, the adjacent stud panels 100, or other stud panels having studs 112, or stud panels 10, 50 where studs 112 have been engaged to end studs 20, can be adjusted relative to each other in the length direction such that, for example, a foundation is made square. Such adjustment may be a matter of millimeters. Then key stud 114 can be engaged to studs 112 of adjacent stud panels with the seal or gasket 116 being resiliently compressed against outer faces 118 of the studs 112. The key stud 114 can be further engaged to end studs 20. The key stud 114 can be engaged to the stud panels 100 such that an outer face 120 of stud 114 can lie flush with an outer face of the exterior sheathing 16 of the stud panels 100. As to the key stud arrangement 110, the Leslie et al. U.S. Pat. No. 6,023,897 issued Feb. 15, 2000 and entitled Adjustable Foundation Wall Arrangement is hereby incorporated by reference in its entirety.

FIG. 11 shows a tortuous path for the entry and exit of fluid such as air and moisture. In other words, such fluid, to pass through the key stud arrangement 110, must make at least two right angle turns.

FIGS. 12A and 12B also show a tortuous path for the entry and exit of fluid. FIG. 12A shows a batt or batten connection 122 and FIG. 12B shows a shiplap connection 124. With the batt connection 122, fluid must make at least one right angle turn to pass through a location where two panels of exterior sheathing 16 meet end to end. With the shiplap connection 124, fluid must make at least two right angle turns to pass through a location where two panels of exterior sheathing 16 meet end to end.

Batt or batten connections 122 may not be used in some panels. However, with the present stud panel having insulation therein, such a batten connection 122 is reinforced with insulation 32 or the compressive force of such insulation 32.

It should be noted that one stud panel may include one or more panels of exterior or interior sheathing 16, 18. Where a stud panel includes more than one panel of exterior or interior sheathing 16, 18, tortuous path connections such as connections 122 and 124 are preferred.

FIGS. 13A and 13B show an isolator 130 for a stud panel peripheral or secondary device 132 such that insulation 32 is isolated from the peripheral 132 and does not interfere with installation, deinstallation, reinstallation or operation or some other function of the peripheral 132. In the case of FIG. 13A, the peripheral 132 is a tie or bolt or anchor for anchoring a stud panel, via second plate 14, to a base or foundation 134. Peripheral device 132, in the case of FIG. 13A, includes anchor 136, nut 138, first washer 140 and second washer 142. Isolator 130 is a tube having a flat bottom, where the tube can be formed of an inexpensive material such as paper. Isolator 130 is engaged to its desired location in the stud panel at the factory prior to the insulation being introduced into the stud panel. On site then, the peripheral or secondary devices are fed into the isolator 130 or accessed via the isolator 130. For example, anchor 136 can be fed into the second plate 14 from an outer face of the second plate 14, then the nut 138 and washers 140, 142 can be fed into the stud panel via the tubular isolator 130, then a wrench can access the nut 138 via the tubular isolator 130. The meaning of peripheral device includes things and devices at a periphery of a stud panel or at any other location of a stud panel such as at a central or medial or side or interior or outer location of a stud panel.

FIGS. 14A and 14B shows that a stud, such as an end stud 20 or inner stud 22, can be other than dimensional lumber, such a metal or plastic or other material or composite material. For example, FIG. 14A shows a tubular stud 150 and FIG. 14B shows a generally U-shaped or channeled stud 152. Such studs hence have at least two functions, one of support for the stud panel, and an additional function as an isolator for peripheral or secondary devices or objects or things such as electrical wires or television cables 154 or phone lines 156. Where U-shaped or channeled stud 152 is employed, an open end 158 of the channel 162 may be closed off against an inner face of sheathing or closed off with a paper elongate generally U-shaped isolator 162.

Plates 12 and 14 are preferably dimensional lumber. If desired, one or more of the structural members may be formed of a composite material, of metal, or of a vinyl or plastic material.

Interior sheathing 18 (or exterior sheathing 16) may include sheet rock (a gypsum wallboard) or a see-through board. A see-through board may be a transparent or translucent board. A transparent board is preferred. A transparent or clear board may be a glass board or a plastic board or a Plexiglas® board. Such a plastic clear board is preferably rigid. After insulation has been blown into inner regions 24, and after the temporary plastic clear rigid board is removed, permanent interior sheathing 18 (or exterior sheathing 16) is engaged to the face from which the plastic clear temporary sheathing 18 has been removed. As to sheetrock and as to a gypsum wallboard, the Burke U.S. Pat. No. 6,699,426 issued Mar. 2, 2004 and entitled Gypsum Wallboard Core, And Method And Apparatus For Making The Same is hereby incorporated by reference in its entirety.

Exterior or outer sheathing 16 (or interior sheathing 18) may be or include dimensional lumber, plywood, oriented strand board (OSB), fiberboard, cementitious board (such as a panel including Portland cement reinforced with a fiberglass mesh material), fiber cement (such as a mix of wood fiber and cement-fiber cement), gypsum (such as a panel including a gypsum core or a panel including a core of gypsum with cellulose and/or perlite), foil or paper faced insulative board, and foam sheathing (including sheathing with extruded polystyrene, expanded polystyrene, or polyisocyanurate). Fiberboard is preferred. Fiberboard is also know as blackboard, grayboard, and buffaloboard. Fiberboard is an engineered compressed board having compressed wood fibers, resin and other materials. The wood material and the other material may be recycled material or recycled fiber. Fiberboard includes a relatively high R-value. Fiberboard has sound attenuating properties that, relative to other boards that include wood, greatly minimize the transmission of sound. Fiberboard is, relative to other boards that include wood, less expensive at the year date 2004. As to fiberboard, the Moriarty et al. U.S. Pat. No. 6,692,670 issued Feb. 17, 2004 and entitled Fiberboard Manufacture Using Low Diisocyanate Content Polymeric MDI-Containing Binders is hereby incorporated by reference in its entirety.

It should be noted that the first plate 12, the second plate 14, exterior sheathing 16, interior sheathing 18, outer studs 20, and inner studs 22 may be engaged to each other or interconnected by one or more of pin connectors such as nails and screws, a bonding agent or adhesive or glue, plate connectors, a cast such as an outer or inner cast of cement or polymeric or copolymeric material, or an inner cast including or consisting of insulation having adhesive or bonding attributes where such insulation is relatively rigid or relatively flexible. FIG. 15 shows such an inner cast, denoted by reference numeral 170, where FIG. 15 is a diagrammatic section view taken along a midsection of the insulation 32 of the stud panel 50 of FIG. 5. Where the first plate 12, the second plate 14, exterior sheathing 16, interior sheathing 18, outer studs 20, and inner studs 22 are interconnected by an outer cast or an inner cast, the first plate 12, the second plate 14, exterior sheathing 16, interior sheathing 18, outer studs 20, and inner studs 22 may be set in a jig prior to being cast. Where engaged via an inner cast, the elements (i.e., the first plate 12, the second plate 14, exterior sheathing 16, interior sheathing 18, outer studs 20, and inner studs 22) "pull against themselves" via the inner cast, thereby lending strength and flexibility to the stud panel as a whole. Where merely an inner cast is utilized, it should be noted that the use of fasteners can be minimized or outright excluded from any of the stud panels of the present invention. Fasteners, such as pin connectors and plate connectors, transmit heat or act as a conduit for energy transmission.

In other words, integral and one-piece inner cast 170 includes insulation portions extending in x, y, and z directions beyond one three-dimensional body portion of such insulation, where each of the x, y and z directions can be defined as one of the length, height and width directions. For example, a generally parallelepiped insulation body portion 172 can be defined as that which fills up one inner region 24. Parallelepiped insulation portion 172 includes a at least one plug portion or extension 174 extending in the x or length direction that ties into an adjacent parallelepiped insulation portion 172 via opening 54 (or extends into an outer stud via opening 58). Parallelepiped insulation portion 172 further includes at least one plug portion or extension 176 extending in the y or height direction via opening 56 for tying into one or more of the first and second plates 12, 14. Parallelepiped insulation portion 172 still further includes at least one plug portion or extension 178 that ties into the exterior sheathing 16 (or inner sheathing 18) via opening 52 and that extends in the z or width direction.

Insulation 32 may be an open cell foam or closed cell foam. Open cell is preferred. After being foamed and after setting, the insulation 32 may be rigid, semi-rigid, semiflexible, soft or elastic. In any of such cases, since the insulation can be one-piece and integral throughout the stud panel, the insulation has at least two functions, one of being insulative, and a second function as providing strength and structure to the stud panel such as, for example, resisting shear forces. Insulation 32 preferably includes a bonding or adhesive agent that bonds or adheres to one or more of first plate 12, second plate 14, exterior sheathing 16, interior sheathing 18, end stud 20 and inner stud 22. Insulation 32, prior to and after setting, may be malleable.

Insulation 32 may be foamed in place or poured beads baked in place or poured beads held in place by sheathing. Foamed in place insulation is preferred. Low density open cell foam insulation is more preferred.

Insulation 32 may be a foam-spray product. Insulation 32 can be a foam that originates as two separate liquids that are heated, conveyed through separate hoses, and joined at a nozzle assembly. After being combined and exiting the nozzle assembly, insulation 32 can expand up to 100 times its liquid volume in less than about ten seconds, whereupon the insulation can be permanently set or at least have a skin thereon, depending upon the type of insulation.

It should be noted that insulation 32 is preferably introduced into the present stud panel at a factory, not on-site. Depending upon the type of insulation 32 used, such insulation may be problematic to human health when sprayed.

Insulation 32 preferably minimizes movement of fluid such as air and moisture.

It should be noted that insulation 32 further minimizes any cupping of exterior or interior sheathing 16, 18.

It should be noted that exterior sheathing 18 need not be a nail base. For example, fiberboard is generally not considered to be a nail base.

It should be noted that the present stud panels can be utilized for a great variety of structures. Residential home structures are preferred.

The present inventive panel may include, in one or more embodiments, one or more of the following types of insulation 32:

1. air-krete or magnesium oxide obtained from salt water (such as in the form of a sprayed in foam);
2. bubble-pack (such as where the bubble-pack is stapled to framing);
3. cellulose (such as in the form of a loose fill, spray on, wet-spray, dense pack, or stabilized);
4. cotton (such as in the form of a batt or loose fill);
5. fiberglass (such as in the form of a blanket, batt, loose fill, stabilized, rigid board);
6. isocyanate or isocyanate-based insulation or an insulation having isocyanate groups (includes Icynene® or polyicynene (brand name) insulation, insulation having methylene diphenylene diisocyanate (MDI) or methyl diisocyanate (also referred to as MDI), rigid or semi-rigid or semi-flexible or flexible isocyanate-based spray on foam insulation);
7. isocyanurate (in the form of an unfaced board, a foil-faced board, or a sprayed in rigid or semi-rigid or semi-flexible foam);
8. mineral wool (such as in the form of a loose fill or batt);
9. paperboard (such as in the form of a foil faced paperboard stapled to framing);
10. perlite (such as in the form of a loose fill);
11. phenolic (such as in the form of a spray on foam or foil faced rigid board);
12. polyethylene (such as in the form of being foil faced and stapled to framing);
13. polystyrene (such as in the form of an expanded polystyrene rigid board or extruded polystyrene rigid board);
14. polyurethane (such as in the form of a rigid or semi-rigid that is sprayed on, or semi-flexible or flexible foam that is sprayed on);
15. rock wool (such as in the form of a loose fill);
16. slag wool (such as in the form of a loose fill); and
17. vermiculite (such as in a loose fill form).

It should be noted that Icynene® semi-flexible modified isocyanate open cell foam insulation having a density of 8.0 kg/m$^3$ is available from Icynene Inc., 5805 Whittle Road, Suite 110, Mississauga, Ontario, L4Z 2J1, CANADA. It should be noted that BioBase 501 (brand name) spray soybean-based flexible polyurethane open cell foam insulation having a density of 0.45 to 0.50 pounds per cubic foot is available from BioBased Systems of 10A Wolfer Industrial Park, Spring Valley, Ill., 61362.

Insulation 32 is preferably a cellular polymer, foamed polymer, polymeric foam or two-phase gas-solid system selected from the group of polystyrene, polyurethanes, polyisocyanates, polyisocyanurates, urea-based foams, phenolics, polyolefins (such as polypropylene and polyethylene), poly(vinyl chloride), epoxy resins, silicon resins, and polyimides. As to polystyrene, a polystyrene foam may be used, and extruded and expanded forms can also be used. As to polyurethane, a polyurethane foam can be formed by the reaction of isocyanates and alcohols in the presence of a blowing agent. The urethane-forming ingredients in a polyurethane foam formulation can be 1) the isocyanate and 2) the polyol (such as a polyether polyol or a polyester polyol or amine polyol or diamine extender polyol); the urethane-forming reaction is known as the gelling reaction since it is the primary means of polymerizing the starting materials into long-chain polymer networks. Carbon dioxide is produced and hence is an in situ blowing agent. The amount of the blowing reaction can be controlled by the water level of the formulation. Polyisocyanurates can be manufactured from isocyanates, one or more catalysts, and a blowing agent. Insulation 32 may be isocyanurate-based and include the formation of an isocyanurate ring by the trimerization of iso-cyanates. A urea-based (formaldehyde-free) foam can be produced by combining a urea-based resin with an aqueous solution of a foaming agent, which includes a surfactant and an acid catalyst or hardening agent. A phenolic foam can be a reaction product of a phenol and an aldehyde blowing agent in the presence of a catalyst. A phenolic foam may be produced by cross-linking polyphenols, such as from resoles and acid catalyst. Suitable water-soluble acid catalysts are mineral acids and aromatic sulfonic acids. Of the above, polyurethanes, polyisocyanates, polyisocyanurates, polyisocyanate polyurea combinations, or poly(urethane isocyanurate) combinations are preferred.

Insulation 32 minimizes and controls radiation (electromagnetic waves), conduction (atomic or molecular collision) and convection (fluid motion), and may be selected on the basis of such thermal performance. Insulation 32 may also be selected for its attributes as to the environment into which it will be placed, its compressive, flexure, shear and tensile strengths, dimensional stability, shock and vibration resistance, chemical, environmental and erosion resistance, space limitations, fire resistance, health effects, ease of application, and cost.

Insulation 32 may be an open celled material or a closed cell material. An open celled material is preferred. If the cells are discrete and the gas phase of each is independent of that of the other cells, the material is a closed cell material. An open cell material is hereby defined as a material where at least 51% of the total number of cells in the material are open cells or cells interconnected via an opening such that gas can pass from one cell to another. With cellular polymer insulation 32, a cellular polymer material having more than about 60% open cells is preferred, more than about 70% open cells is more preferred, more than about 80% open cells is even more preferred, and more than about 90% open cells is most preferred.

Insulation 32 is preferably a cellular material or foam that is self supporting.

Insulation 32 may be a rigid, semi-rigid, semi-flexible or soft cellular polymer material. A semi-rigid or semi-flexible cellular polymer material is preferred. A foamed plastic of insulation 32 is rigid or flexible on the basis of ASTM D1566-82 as reported in Volume 37, ASTM, Philadelphia, Pa. (1982), where a flexible foam plastic is one that does not rupture when a 20×2.5×2.5 centimeter piece is wrapped around a 2.5 centimeter mandrel at a uniform lap rate of one lap per five seconds at 15 to 25° C. A rigid foam is one that does not rupture under such a test. Compositions of semi-rigid and semi-flexible foams may or may not rupture under such a test.

The physical properties of the final form of insulation 32 may be varied by controlling the degree of cross-linking in the final polymer. The average molecular weight (number average molecular weight as determined by osmometry or end-group titration) between cross-links is about 400 to about 700 for rigid polyurethane foams, about 700 to about 2500 for semirigid polyurethane foams, and about 2500 to about 20,000 for flexible polyurethane foams. The variation between cross-links can be controlled by the polyol. The equivalent weight (the ratio of molecular weight to hydroxyl units) can be used as a criterion for the expected foam rigidity. The equivalent weight of polyhydroxy resins used for rigid foams are less than about 300, for semirigid foams between about 70 and about 2000, and for flexible foams between about 500 to about 3000.

Insulation 32 if preferably of a kind, such as cellular polymer insulation that expands to fill up all empty spaces in the inner regions 24, that minimizes racking in a prefabricated stud panel of the present invention. Racking is a form of stress that may generate a rocking or swaying motion of the panel as a whole or a portion of the panel relative to another portion. By filling up all open spaces in the inner regions 24, a monolithic panel is provided, thereby, for example, minimizing a pivoting of a plate relative to a stud. At the same time, since prefabricated stud panels by nature are transported from a factory to a construction site, such cellular polymer insulation is preferably semi-flexible or flexible so as to accommodate bumps and vibrations caused by such transportation, so as to maintain engagement with the plates, studs and sheathing, so as to retain its own integrity and not crack, and so as to accommodate racking, rocking and swaying forces; such insulation may be compared to a tree bending but not breaking in a hurricane. Rigid or semi-rigid cellular insulation when being transported has a tendency to crack or become separated from studs, panels and sheathing when bumped or vibrated or when subject to like forces; such insulation may be compared to a tree snapping in a hurricane.

Insulation 32 is preferably a type of insulation with a relatively light or low density. Cellular polymer, preferably open cell, insulation 32 has a density of between about 6 kg/M$^3$ and about 40 kg/m$^3$, preferably between about 6 kg/m$^3$ and about 20 kg/m$^3$, more preferably between about 6 kg/m$^3$ and about 15 kg/m$^3$, even more preferably between about 6 kg/m$^3$ and about 10 kg/m$^3$, yet more preferably between about 7.0 kg/m$^3$ and about 9 kg/m$^3$, still more preferably between about 7.0 kg/m$^3$ and about 8.5 kg/m$^3$ and most preferably between about 7.2 kg/m$^3$ and about 8.5 kg/m$^3$, where measured in accordance with ASTM D 1622 and where the samples were taken from a wall cavity specimen.

Insulation 32 can be, but is not preferred to be, structural foam. Structural foam has a relatively high density of 300 kg/m$^3$ or more.

Insulation 32 is preferably a thermoset polymer.

Insulation 32 is preferably formed by expanding a fluid polymer phase to a low density cellular state and then preserving the state.

Insulation 32 is preferably of a kind that will not support combustion. Insulation 32 may be consumed by flame, but will not sustain flame upon removal from the flame source. It should be noted that cellulose, even if treated with fire-retardant agents, is generally regarded as combustible, especially with the passage of time.

Insulation 32 is preferably not absorbent to moisture. It should be noted that fiberglass batts and wet sprayed cellulose absorb water.

Insulation 32 is preferably insulation that will not be damaged by water. Fiberglass batts and cellulose can be damaged by water.

Insulation 32 is preferably insulation that has a minimal air permeance. Insulation 32 preferably has an air permeability of between about 0.001 and about 0.009 L/S-m$^2$ @ 75 Pa for a 5.25 inch thick section of insulation foam, more preferably between about 0.003 and about 0.007 L/S-m$^2$ @ 75 Pa for a 5.25 inch thick section of insulation foam, even more preferably between about 0.004 and about 0.006 L/S-m$^2$ @ 75 Pa for a 5.25 inch thick section of insulation foam, and most preferably about 0.005 L/S-m$^2$ @ 75 Pa for a 5.25 inch thick section of insulation foam, as measured in accordance with ASTM E283.

Insulation 32 is preferably a "breathing" air barrier. Insulation 32 is preferably open celled where convective air movement is minimized.

Insulation 32 is preferably insulation that is water vapor permeable, allows structural moisture to diffuse and dissipate, and does not entrap moisture in materials to which it is applied. Insulation 32 preferably includes a water vapor permeance of between about 7 and about 13 perms 565 ng/(Pa·s·m$^2$) for a five inch (127 mm) thick section, more preferably between about 8 and about 12 perms 565 ng/(Pa·s·m$^2$) for a five inch (127 mm) thick section, even more preferably between about 9 and about 11 perms 565 ng/(Pa·s·m$^2$) for a five inch (127 mm) thick section, and most preferably about 10 perms 565 ng/(Pa·s·m$^2$) for a five inch (127 mm) thick section, where measured in accordance with ASTM E96.

Insulation 32 is preferably insulation that will not wick moisture. Insulation 32 is preferably hydrophobic. Insulation 32 preferably does not exhibit capillary properties. Insulation 32 is preferably insulation where water drains by gravity rather than travel horizontally or vertically. Insulation 32 is preferably insulation where, upon drying, thermal performance is fully restored. Fiberglass batts and wet-sprayed cellulose are types of insulation that wick moisture.

Insulation 32 preferably, when manufactured, has a minimal impact on the environment.

Insulation 32 is preferably a kind of insulation that has a minimal impact on indoor air quality (IAQ). For example, cotton, polystyrene, polyisocyanurate, phenolic, polyurethane, and air-krete are types of insulation that have a minimal impact, or a less than minimal impact, on indoor air quality. Types of insulation that have a greater than minimal impact on indoor air quality are cellulose, fiberglass, mineral wool, and perlite.

Insulation 32 is preferably of a form where the R-value can be managed in a factory with a minimum amount of effort and cost. An insulation R-value relates to the resistance the insulation has to the flow of heat. A higher R-value means a greater resistance to the flow of heat. For example, insulation that is sprayed on is in a form that can be managed in a factory with a minimum amount of resources, effort and cost; a spray on insulation, for example, requires no fasteners and hence no additional fixing step. Insulation in the form of boards, loose fill, batts, or a form requiring stapling are forms that are managed in a factory with a greater than minimal amount of resources, effort and cost; these forms, for example, require fasteners and additional steps to fix such insulation to the present panel.

Insulation 32 that includes an adhesive or bonding agent or resin for bonding with the substrates of the outer studs, inner studs, outer and inner sheathing, and top and bottom plates is preferred. Such substrates may be or include metal such as steel, wood, masonry, plastic, plastic foam, or concrete. Adhesives or bonding agents that adhere or bond with a wood substrate are more preferred. Such a resin is preferably a resin that can be sprayed and can generate a froth foam. Epoxy resins can be sprayed and can generate a froth foam.

Insulation 32 preferably includes an adhesive, bonding agent or resin that permits the insulation 32 to be bonded to the underside of a substrate, such as to the underside of a roof structure, without gravity pulling the insulation 32 from such an underside, even with the passage of a great amount of time, such as the life span (100 years to 200 years) of a residential house.

Insulation 32 preferably includes a resin that is identical to, or similar in properties to, a resin in the outer or inner sheathing such that insulation 32 may bond well with such outer or inner sheathing. For example, the outer or inner sheathing may be a fiber or composite board that includes an isocyanate or isocyanurate-based resin, and insulation 32 may be or include an isocyanate-based resin.

Insulation 32 that includes an adhesive or bonding agent or resin for bonding with itself, when wet or dry or when in a set or non-set form, is preferred. An insulation 32 that bonds to itself provides for an integral and one-piece internal cast for the present panel. An insulation 32 that bonds to itself provides for an integral and one-piece internal cast because, for example, insulation 32 that expands from one inner region 24 to an adjacent inner region 24, such as through hole 54 or thermal break 60, can subsequently be integrally tied to insulation that is subsequently sprayed in the adjacent inner region 24. For one present panel, insulation 32 can be sprayed into each of the inner regions 24 simultaneously or sequentially within about sixty seconds, well within the cure time for insulation such as a resin-containing polyisocyanate thermal insulation, such that insulation 32 expanding from one inner region 24 to an adjacent inner region 24 can be tied to (bonded with) insulation in such adjacent inner region 24 such that insulation 32 in adjacent inner regions 24 are in fact integral and one-piece.

It should be noted that even if cellular polymer insulation 32 expanding from one inner region 24 to an adjacent inner region 24 does not bond back to itself, a positive mechanical lock is nevertheless formed by 1) such expansion into the openings 52, 54, 56 and 58 and 2) expansion of the expanding foams into each other. For example, a portion of cellular polymer insulation expanding from hole 54 and beyond into an adjacent inner region 24 may bite into cellular polymer insulation already foamed in such adjacent inner region 24. If cellular polymer insulation has not yet been injected into such adjacent inner region 24, the portion of the cellular polymer insulation that has expanded through hole 54 and beyond may be mechanically captured by cellular polymer insulation when such cellular polymer insulation is introduced into such adjacent inner region 24, thereby tying together cellular polymer insulation in adjacent inner regions 24.

Insulation 32 may be a soybean based cellular polymer material. For example, where supplied in two components, an A-side may comprise isocyanate and a B-side may comprise a multifunctional alcohol, a vegetable oil such as soybean oil that is blown/oxidized, and a catalyst. A vegetable based or soybean based cellular polymer insulation is a non-petroleum based foam. As to such soybean based cellular polymer insulation, the following U.S. Patents are hereby incorporated by reference in their entireties: 1) the Kurth U.S. Pat. No. 6,465,569 issued Oct. 15, 2002 and entitled Plastic Material and 2) the Petrovic et al. U.S. Pat. No. 6,686,435 issued Feb. 3, 2004 and entitled Method Of Making Natural Oil-Based Polyols And Polyurethanes Therefrom.

Insulation 32 that is autofrothing is preferred. Insulation 32 that is autofrothing with carbon dioxide is more preferred.

Insulation that provides an air barrier is preferred. Such insulation includes spray on or foam insulation. More preferred is insulation that expands from a pressurized or liquid state (greater than atmospheric pressure) to a state under atmospheric pressure, such as upon installation where the insulation is being released from a nozzle. An installation that expands upon installation naturally and automatically fills up dead space in an inner region 24 or other area of the present panel and hence becomes an air barrier. Insulation expanding from a pressurized state (greater than atmospheric pressure) to a state at atmospheric pressure by more than 10 times is preferred, more than 50 times is more preferred, more than 80 times is even more preferred, and by 100 times or more is yet more preferred, where an upper limit is about 150 times. Such air barrier insulation minimizes the use of sealing material. Insulation 32 can be a type of insulation that, when poured in, expands upwardly to about 60 times from the original or initial liquid pressurized volume and that, when sprayed in, expands to about 100 times from the original or initial liquid pressurized volume, where an upper limit is about 150 times.

Insulation 32 that is blown with a nontoxic fluid is preferred. Water-blown insulation is more preferred. Insulation that is 100% water blown is even more preferred.

Insulation 32 that contains no volatile organic compounds (VOCs) is preferred.

Insulation 32 that, when dry or set at atmospheric pressure, has a maximum amount of air is preferred. Insulation that contains between about 90% and about 99.9% air is preferred, between about 95% and about 99.9% air is more preferred, and between about 97% and about 99.9% air is even more preferred.

Insulation 32 that, when dry or set at atmospheric pressure, has a minimum amount of material (or solid) is preferred. Insulation that contains between about 0.1% and about 10% material is preferred, between about 0.1% and about 5% material is more preferred, and between about 0.1% and about 2% material is even more preferred. Hence, with the use of insulation 32, material waste is minimized.

Insulation 32 preferably includes no HCFCs (Hydro-Chloro-Fluoro-Carbons), HFAs (Hydrofluoroalkane-134a), and HFCs (Hydro-Fluoro-Carbons).

Insulation 32 that contains no formaldehyde is preferable. Fiberglass batts contain formaldehyde.

Insulation 32 that does not settle or sag under the influence of gravity is preserved.

Insulation 32 is preferably insulation that does not shrink after setting.

Insulation 32 is preferably insulation with a minimal amount of expansion time as measured from a pressurized liquid state (greater than atmospheric pressure) to a fully expanded state at atmospheric pressure. Such minimal amount of expansion time is preferably less than about 15 seconds and more preferably less than about ten seconds. Insulation 32 preferably dries or sets or cures within about five minutes after such expansion, whereupon the insulation may be cut such as by scarfing (a saw type action with a toothed blade or smooth knife-like blade or heated wire instrument).

Insulation 32 is preferably insulation that has no food value for termites and that is not a food source for mold.

Insulation 32 is preferably insulation that has no harmful emissions.

Insulation 32 is preferably insulation that may be poured or sprayed. If poured, the present panel may be oriented in either a vertical direction (where the outer and inner studs extend vertically) or a horizontal direction (where the outer and inner studs extend horizontally) or at an angle between the vertical and horizontal directions. If sprayed, the present panel may be oriented in either a vertical direction (where the outer and inner studs extend vertically) or a horizontal direction (where the outer and inner studs extend horizontally) or at an angle between the vertical and horizontal directions. If poured with the present panel in a horizontal direction, one or more of the inner and outer sheathing may be in place prior to pouring. If sprayed with the present panel in the horizontal direction, one or more of the inner and outer sheathing may be in place prior to spraying. If poured with the present panel in a vertical direction, one or more of the inner and outer sheathing may be in place prior to pouring. If sprayed with the present panel in the vertical direction, one or more of the inner and outer sheathing may be in place prior to spraying.

The cellular polymer insulation 32 may be a soft and flexible foam or semi-flexible foam or a semi-rigid foam or a hard, rigid foam. A soft, semi-flexible or semi-rigid form of cellular polymer insulation 32 is preferred of these, a soft foam or semi-flexible foam is more preferred.

Insulation 32 is preferably a type of insulation that expands in the direction of least resistance.

Insulation 32 is preferably of a type that minimizes vibrations of peripheral structures in walls and that thereby minimizes sound. Soft and flexible forms or soft and semi-flexible forms of cellular polymer insulation 32 isolate and absorb such vibration, such as by distributing such vibration throughout the entire body of the soft and flexible or semi-flexible insulation.

Where the present stud panel includes primarily "two by four" studs, such a stud panel meets or exceeds the following performance, where for example the present stud panel attains of rating of 19 or better for sound transmission at a hertz frequency of 125 pursuant to ASTM E90 or a rating of 0.11 or better for noise reduction at a hertz frequency of 125 pursuant to ASTMC423:

| STC Sound Transmission Class - 37 | | | | | | |
|---|---|---|---|---|---|---|
| Hz. Freq.: | 125 | 250 | 500 | 1000 | 2000 | 4000 |
| ASTM E90: | 19 | 30 | 31 | 42 | 38 | 46 |
| NRC Noise Reduction Coefficient - 70 | | | | | | |
| Hz. Freq.: | 125 | 250 | 500 | 1000 | 2000 | 4000 |
| ASTM C423: | 0.11 | 0.43 | 0.89 | 0.72 | 0.71 | 0.67 |

Insulation 32 of one present wall panel preferably includes on the order of millions of relatively small cells filled with air.

Insulation 32 preferably includes a thermal resistance (R/inches), where measured in accordance with ASTM C518, of between about R3.1 and R4.1 hr. ft$^2$ ° F./BTU, more preferably between about R3.3 and R3.9 hr. ft$^2$ ° F./BTU, even more preferably between about R3.5 and R3.7 hr. ft$^2$ ° F./BTU, and most preferably about R3.6 hr. ft$^2$ ° F./BTU.

Insulation 32 is preferably thermal and sound insulation that is a spray-in-place, low-density, semi-flexible plastic foam that has an open cell structure.

Insulation 32 is preferably formed by two components, such as 1) an isocyanate or isocyanate based or modified isocyanate or isocyanate derivative and 2) an adhesive or bonding agent or resin or polyol such as a polyol amine or resin.

Insulation 32 is preferably formed by two components, where the two components are combined at a 1 to 1 fixed ratio with positive displacement equipment.

Insulation 32 preferably is made from generally two components, where the two components are applied in a liquefied state using a metering unit, where the two components when combined produce carbon dioxide gas (or other non-ozone depleting gas) for acting as a foaming agent, where one component is an isocyanate or isocyanate-based or isocyanate derivative, and where the other component is a water-based resin composition having a blend of polyols, surfactants, catalysts and a blowing agent (where, for example, carbon dioxide is not produced in situ).

Catalysts used in the production of insulation 32 include tin and tertiary amine catalysts.

Insulation 32 preferably includes a non-white or non off-white color throughout, such as throughout a cellular polymer material. A non-white color provides a contrast to interior sheathing where the interior sheathing is white or off-white. Sheet rock is an example of a white or off-white interior sheathing. A fabricator or homeowner can better tell where sheet rock ends and such non-white insulation 32 begins, a distinction that can become difficult with cellular polymer insulation that expands to fill all empty spaces and that adheres to sheet rock. Such a distinction is advantageous when, for example, cut-outs such as for windows are formed in the stud panel of the present invention. Of non-white colors, a green or green-like color is preferred since such a color is distinct from normally black electrical lines and television cables and the normally natural color of studs and panels and the wood found in fiberboard. Synthetic coloring agents or natural coloring agents may be used. For example, a soybean based polyurethane foam may have a green or green like natural coloring agent.

As to insulation 32 and methods and apparatus for applying such and as to the present panel as a whole, the following U.S. Patents are hereby incorporated by reference: 1) the Chiocchio U.S. Pat. No. 3,962,120 issued Jun. 8, 1976 and entitled Polyurethane Foam Generating Apparatus; 2) the Zwirlein U.S. Pat. No. 4,204,977 issued May 27, 1980 and entitled Polyurethane Foam Generating Apparatus; 3) the Zimmerman et al. U.S. Pat. No. 4,239,916 issued Dec. 16, 1980 and entitled Isocyanurate Foam Catalyst; 4) the Elgie U.S. Pat. No. 4,407,982 issued Oct. 4, 1983 and entitled Process For The Manufacture Of Foamed Structures; 5) the Keshi et al. U.S. Pat. No. 4,451,587 issued May 29, 1984 and entitled Polyurethane Foam And Its Production; 6) the Hager U.S. Pat. No. 4,950,694 issued Aug. 21, 1990 and entitled Preparation of Polyurethane Foams Without Using Inert Blowing Agents; 7) the Slyvester U.S. Pat. No. 4,992,483 issued Feb. 12, 1991 and entitled Polyurethane Foam Product And Process; 8) the Jacobs et al. U.S. Pat. No. 5,278,197 issued Jan. 11, 1994 and entitled Soft, Flexible Polyurethane Foam; 9) the McAfee et al. U.S. Pat. No. 5,373,028 issued Dec. 13, 1994 and entitled Polyurethane Foams Having Reduced Visible Emissions During Curing; 10) the Baker, Jr. et al. U.S. Pat. No. 5,500,452 issued Mar. 19, 1996 and entitled Soft, Low Density Flexible Polyurethane Foam; 11) the Brown et al. U.S. Pat. No. 5,526,957 issued Jun. 18, 1996 and entitled Multi-Component Dispenser With Self-Pressurization System; 12) the Hager et al. U.S. Pat. No. 5,596,059 issued Jan. 21, 1997 and entitled Polyether Polyols Suitable For Flexible Polyurethane Foam Prepared By Co-initiation Of Aqueous Solutions Of Solid Polyhydroxyl Initiators; 13) the Hurray et al. U.S. Pat. No. 6,283,221 issued Sep. 4, 2001 and entitled Two-Component Polyurethane Box Kit; 14) the Kurth U.S. Pat. No. 6,465,569 issued Oct. 15, 2002 and entitled Plastic Material; 15) the Falke et al. U.S. Pat. No. 6,583,192 issued Jun. 24, 2003 and entitled Preparation Of Flexible Polyurethane Foams; 16) the Parfondry et al. U.S. Pat. No. 6,590,008 issued Jul. 8, 2003 and entitled Process For Making Low Density Foams, Polyol Composition And Reaction System Useful Therefor; 17) the Petrovic et al. U.S. Pat. No. 6,686,435 issued Feb. 3, 2004 and entitled Method Of Making Natural Oil-Based Polyols And Polyurethanes Therefrom; 18) the Hunter U.S. Pat. No. 6,695,224 issued Feb. 24, 2004 and entitled Spray Nozzle For A Two-Component Air-Assisted, Low Pressure Spray System; and 19) the Munzenberger et al. U.S. Pat. No. 6,706,774 issued Mar. 16, 2004 and entitled Two-Component On-Site Foam System And Its Use For Foaming Openings For The Purpose Of Fire Protection.

The present stud panel is not simply a stud framing system that can be manufactured on a framing line, but rather is an entire system encompassing framing, the inclusion of insulation and placing both the inner and outer wall skins on the stud panel as a whole. The whole panel system provides for monolithically assembling the entire unit by using even low density insulation 32 as a structural component, by further using insulation 32 as a bonding agent, and by minimizing the use of fastening with nails or screws.

Foam 32 can be contained in the stud cavity or inner region 24 under a temporary pressure plate that is laid over each panel before the cavities 24 are filled. Plexiglas® can be used as the pressure plate so that one can observe the performance of the foam 32 as it expands.

The components, including both top and bottom plate 12 and 14, of the stud frame can be assembled, without fasteners, in a jig, on top of the inner skin, with the outer skin lightly pressed down on the whole assembly. Insulation 32 is to be injected into the stud cavities where it will adhere to all surfaces, including the stud faces and inner and outer skins, thereby minimizing or obviating the need for fasteners, except, by way of example, for the perimeter fasteners required by code, to resist racking sheer.

Aggressively expanding spray foam being used as the insulating medium 32 can be contained within a closed cavity 24.

The holes (such as 52, 54, 56 and 58) that are strategically bored into each stud, sheathing or plate, provide a means of absorbing overexpansion of the foam installation 32 as it forms in the stud cavity. This expansion of the foam 32 into the stud creates a positive mechanical lock between the foam and the stud that increases structural strength and reduces potential for racking sheer. A second use for the holes 52, 54, 56, 58 is to provide passages for electrical conduits being installed horizontally or vertically or otherwise in the panel. The foam filled holes 52, 54, 56, and 58 will also reduce heat loss through the studs, plates and sheathing and improve acoustic insulation.

The opening 28 at one or both ends of the panels can be used as a form of volume control. Excess foam 32 can be released through this hole 28 to be sliced off as scarf after the material has cured. This opening 28 can also be used to accommodate placing spray guns in a position where an operator can control movement. There is therefore a minimum practical opening. However, other openings may be used, such as provided by a structure where two skins start at each plate and terminate short of each other and do not meet in the middle.

Several nozzles speared through the fiber board or outer skin or outer sheathing (or inner skin or inner sheathing) can meter the foam 32 into the stud cavity 24. Multiple nozzles can provide better process control and more even foam expansion. The automatically controlled nozzles can swing in an arc to mimic manual application. A multiple nozzle apparatus may be stationary or include moving nozzles.

At the factory or other prefabrication site, either a closed stud panel or open stud panel may be fabricated and then transported to the construction site. A closed stud panel includes the outer and inner sheathing, the outer and inner studs, the top and bottom plates, electrical or other peripheral devices, and insulation 32. An open panel includes one or more less features than a closed panel and may or may not include the insulation 32. Closed stud panels may be mudded in at the factory and transported to the construction site.

The present stud panel with insulation 32 is a shear wall that requires no bracing and that can support almost any siding system, including face brick and stucco systems.

The present stud panel may be cut into such that curved cutouts such as arches may be formed.

FIG. 16 is a flow chart for one method of making a stud panel according to the present invention. One or more of the steps shown in FIG. 16 may be used in such a method. The method of FIG. 16 is preferably started on a relatively large work surface such as a table set about three feet above a floor, where the table is generally horizontal. The method of FIG. 16 is preferably operated in the sequence shown in FIG. 16 and pursuant to features and steps described above and below.

In FIG. 16, the step 200 of framing includes attaching the dimensional lumber to itself, such as engaging the outer studs 20 and inner studs 22 to the top and bottom plates 12, 14 with pin connectors such as nails.

The step 202 of squaring includes the step of making each of the corners of the framed stud panel an exact and true ninety degrees, where the framed stud panel may be slightly racked to generate the squared and framed stud panel. The steps of framing and squaring may be combined, or in a sense eliminated, by a step of placing the dimensional lumber, including the outer studs 20, inner studs 22, and top and bottom plates 12, 14, in a jig that is preset square, whereupon exterior sheathing 16 may be engaged to the preset components.

The step 204 of engaging the first sheathing, such as the exterior sheathing 16 such as fiberboard, includes the step of affixing the exterior sheathing 16 to an open face of the exterior sheathing 16 such as with pin connectors while the stud panel is still squared. After the step of engaging the exterior sheathing 16, the means for holding the trueness or squareness of the framed stud panel may be removed because the exterior sheathing 16 itself keeps the framed stud panel squared. If desired, the step of engaging the first sheathing can include the step of engaging the interior sheathing 18 such as sheet rock, and not engaging the exterior sheathing 16 at such time.

The step 206 of flipping includes flipping the stud panel 180 degrees such that the sheathing that was just engaged (such as the exterior sheathing 16) confronts the surface of the table and such that an open face of the stud panel now confronts a worker.

The step 208 of installing electrical, mechanical and/or plumbing peripherals includes installing electrical conduits, heating and cooling ducts and water or venting pipes and tubes. At this point in time, isolators such as isolators 130 and 162 may be installed.

The step 210 of sheeting includes the step of engaging the transparent or clear plastic sheet or vapor barrier 43 over the open upper face of the stud panel, and the to-be-pinched sheet portion 47 to one or more of the studs and bottom plate 14. Further, the step of sheeting may not occur, or occur once where such is affixed directly inwardly of one of the interior and exterior sheathing, or occur twice at different times, a first time directly inwardly of one of the interior and exterior sheathing and a second time directly inwardly of the other of the interior and exterior sheathing.

The step 212 of covering with a clear or transparent solid plate or plate having a clear or transparent solid portion includes placing the clear and transparent temporary sheathing 18 on the stud panel having the clear plastic sheet 43. Then portion 45 is folded back over the upper face of the temporary sheathing 18 so as to expose open ends 28. It should be noted that a further set of open ends may be provided, where each of the open ends is opposite one of the open ends 28, such that temporary clear sheathing 18 lies in a middle portion of the present stud panel; however, with such an arrangement, sprayed in insulation may be somewhat difficult to contain. Hence a closed end 26, is preferred. It should be noted that, as indicated above, two sections of clear transparent temporary sheathing 18 may be used, each forming a closed end adjacent one of the plates 12, 14; however, with such an arrangement, a worker may have to climb on top of a work table to place a spray gun into position, and the present stud panel and attendant work surfaces may run about 20 feet to about 28 feet to about 40 feet or more in length.

The step 212 of covering with a clear or transparent solid plate or plate having a clear and transparent solid portion includes the step of providing a counter to the clear or transparent solid plate or such portion. A counter may be provided by the weight of the temporary sheathing 18 itself. And/or a counter may be provided by engaging the sheathing 18 to the stud panel itself with pin connectors, such as to the outer studs 20, inner studs 21, top plate 12, or bottom plate 14. And/or a counter may be provided by placing weights, such as bags filled with sand, on the upper surface of the clear temporary sheathing 18. Foam blown insulation is typically blown into a cavity at an already constructed building at a construction site at about 600 to 800 pounds per square inch (psi). At such a pressure, a framed and squared stud panel, even with one sheathing engaged, and even with the temporary sheathing or a second sheathing also engaged, can be blown apart and, even if not blown apart, easily structurally damaged. With the present invention, less than about 200 psi is preferred, with a preferred range being about 100 psi to about 200 psi. It should be noted that, even under 200 psi, such as about 125 psi to about 175 psi, cellular polymer blown insulation 32 can, without a counter mentioned above, in the stud panel shown in FIG. 1, blow or flow 1) from one inner cavity 24 to an adjacent inner cavity 24 over the edge of an inner stud 22 confronting the clear pressure plate or clear temporary sheathing 18, 2) from one inner cavity 24 over an edge of an outer stud 20 confronting the clear pressure plate 18 to the outside environment, and/or 3) from one inner cavity 24 over an edge of the top or bottom plate 12, 14 confronting the clear pressure plate 18 to the outside environment. A counter minimizes or outright eliminates such unintended blow-over or blow-by insulation. A lesser pressure for the blown insulation, such as under 200 psi, is a more controllable pressure. The pressure plate 18 is preferably rigid, more preferably as rigid as a slab of concrete, such that pressure from expanding foam at 200 psi cannot flex or bend the pressure plate 18. Counters may be located on the perimeter of the pressure plate 18 and on an interior face of the pressure plate 18, such as aligned with the inner studs.

It should be noted that a transparent portion to temporary sheathing 18 is preferred such that quality control can be monitored. A better quality product is a product where insulation is blown into all empty spaces, where such spaces may be defined at least in part by electrical, mechanical and/or plumbing peripherals, windows, doors, and/or other peripherals, and where such spaces may therefore be irregular or unique or custom made spaces.

It should be noted that a solid flat portion to temporary sheathing 18 is preferred such that the blown in insulation lies flat and generally planar to stud edges such that the blown in insulation itself has a pair of faces that are generally planar to lie flat against one inner face of the interior sheathing and one inner face of the exterior sheathing. A solid portion is preferred over a structure such as a wire screen because, for example, the pressure from the blown in insulation may create a matching wire screen void forming pattern. Further, wire screens may not be sufficiently strong to counter blowing pressure. Moreover, without sheeting, insulation is blown through a wire screen.

The step 214 of introducing insulation includes the step of blowing in cellular polymer insulation 32. The step of introducing insulation may include 1) the step of blowing insulation into one inner region 24 at a time and 2) the step of blowing insulation into two or more inner regions 24 simultaneously. The step of introducing insulation includes the step of visually monitoring the blowing to ensure that all empty spaces are filled. The step of simultaneously blowing may be preferred where the stud panel includes one of the thermal breaks 60 or one or more of the openings 54 such that insulation 32 may be tied to itself prior to a skin forming on an exterior of blown insulation. The step of blowing preferably includes the step of blowing insulation at the relatively low pressure range of between about 125 psi and about 175 psi. The step of blowing may include the step of introducing a spray gun without a wand into the open end 28 and using a cannon stream nozzle to shoot a cannon stream of insulation from the open end 28 (or from just inside an edge of the pressure plate 18) to the closed end 26, and then incrementally blowing insulation from the closed end 26 to the open end 28 while visually monitoring the fill.

The step 216 of scarfing includes the step of using an elongated instrument, such as a long bladed saw or knife or heated electrical wire extending from a handle, to trim excess insulation from the open end 28. A tool having a handle and a power unit for generating electricity to heat an elongated wire extending from the handle generates a smooth flat cut surface to the scarfed insulation 32. The step of scarfing may be employed prior to or after the step of removing the transparent solid plate or plate having a transparent solid portion.

The step 218 of removing the transparent solid plate or plate having a transparent solid portion includes the step of entirely removing the clear pressure plate 18 from the present stud panel, and includes the step of removing any counters that may be present. The temporary clear pressure plate 18 may be used again for a subsequent stud panel.

The step 220 of engaging the second sheathing includes the step of engaging, preferably, the permanent interior sheathing 18 such as sheet rock. If desired, after removing the temporary sheathing 18, the step of sheeting may be employed if not employed earlier. Or, even if employed earlier, the first applied sheeting may be removed, and another sheeting may be engaged over the blown in insulation 32. If, in the step of engaging the first sheathing, the sheathing that was engaged was the interior sheathing, then exterior sheathing is applied in the step of engaging the second sheathing. It should be noted that the step 220 of engaging the second sheathing may be not be employed where, for example, sheet rock will be engaged to the stud panel at the construction site.

The step 222 of stacking the stud panels includes the step of placing individual stud panels on top of each other, for example, six to twelve stud panels face to face.

The step 224 of shrink wrapping a stack of stud panels includes the step of tightly holding a stack together to, for example, maximize safety during transport and minimize damage to individual stud panels such as caused by shifting or dirt or rain or snow.

The step 226 of transporting shrink wrapped stacks to a construction site includes the step of using a tractor trailer or semi-trailer to transport the stacks from the factory to the construction site.

In the method shown in FIG. 17, the method as described with respect to FIG. 16 applies with the exceptions as noted below. The method of FIG. 17 generally relates to the stud panel shown in FIG. 5.

It should be noted that the method of FIG. 17 may employ one or two flipping steps. That is, preferably the sheathing that is first engaged is the exterior sheathing 16 such that the squareness of the framed and squared stud panel may be better retained. Then, after the step 250 of engaging the second sheathing, preferably interior sheathing such as sheet rock, the stud panel is flipped again, pursuant to flipping step 252, such that the exterior sheathing 16 is accessible and such that the interior sheathing confronts the working surface of the table. Then step 254 of forming openings in the stud panel is employed, with the openings 52 preferably being formed in the exterior sheathing 16. If desired, exterior sheathing 16 may be supplied with the openings 52 preformed therein, wherein step 254 is optional.

It should be noted that, where the sheathing that is first engaged in step 204 in the method shown in FIG. 17 is the interior sheathing, then only one flipping step is employed (i.e., flipping step 252 is not required because the exterior sheathing is the second sheathing to be engaged to the stud panel and is therefore immediately accessible).

The step 256 of introducing insulation in a predefined manner includes the step of automatically (such as robotically) blowing insulation into the openings 52 of stud panel 50 shown in FIG. 5 or even into openings 28 of stud panel 10 shown in FIG. 1. With pressure plate 18 and with the step of introducing insulation, either manually or automatically, the step of scarfing is minimized and insulation waste is minimized. With stud panel 50 of FIG. 5, the step of scarfing is further minimized and insulation waste is further minimized because, for example, parameters such as temperature (such as of the environment and of the components that form insulation 32), pressure (such as of the environment and of the components that form insulation 32), volume (of the components for forming the insulation) and time (such as for preheating of the components, blowing the insulation, expansion of the insulation, and setting of the insulation) may be predefined or adjusted on the fly automatically. In step 256, the apparatus 70 described in relation to FIGS. 6 and 7 may be employed. Step 256 can, if desired, be employed with a clear pressure plate such that step 214 of introducing insulation can include the features of step 256.

After step 256, a step of scarfing can be employed with relation to openings 52, 56 and 58 that are situated on the exterior of the stud panel. However, such scarfing is minimal.

After any such scarfing, the stud panels can be stacked pursuant to step 222, then shrink wrapped pursuant to step 224, and then transported to the construction site pursuant to step 226.

It should be noted that the present invention produces scarfing that is attractive. In other words, the face of the insulation that remains after scarfing, with or without the step 216 of sheeting, is flat, has a minimum number of voids or includes essentially no voids, and is coplanar with the exposed edges of the outer and inner studs.

It should be noted that the present invention preferably does not employ poured expansive insulation or the step of pouring. Poured expansive insulation expands to a lesser volume than does blown in or sprayed in insulation. Hence, there is a significant amount of more insulation or substrate that is required with poured in insulation than with the present inventive method, which can be described as a forced blown expansion or controlled blown expansion. Whereas blown insulation expands perhaps 100 times from a fluid state, poured insulation expands to a significantly lesser extent and thereby uses more substrate per given area.

The present stud panel is preferably a wall panel. However, if desired, the present stud panel can be a floor panel.

It should be noted that insulation 32 that can be readily shredded is preferred. Polymer cellular insulation that is semi-rigid or semi-flexible may be readily shredded and used for pour in insulation.

With the present invention, a controlled expansion provides a more complete fill not only at the face of the stud panel, but also along the "six inch" or "four inch" side of the inner and outer studs. At the construction site, with an open cavity at 600 to 800 psi, insulation blows out and expands rapidly. Even with a great amount of expansion and even with experienced workers, such blown insulation tends to expand outward, away from the open face of the cavity. Such an outward area of expansion is taken away by the pressure plate 18, thereby forcing more insulation in other areas, such as the area along the wide sides of the studs.

With the present invention, and with the pressure plate 18 or via step 256 with the second sheathing, heat is retained.

Such increases the capability of the insulation to adhere to all surfaces. It should be noted that, with blown in or sprayed in apparatus, the components are heated, the hoses from the component storage are heated, and the spray guns are heated. The present invention utilizes such heat energy even after such heat energy leaves the tip of the spray gun because such heat is retained under the pressure plate 18 or second sheathing. Such heat energy is lost rapidly at the construction site with an open faced cavity. Component fluid storage temperature is preferably in the range of about 110° F. to about 150° F., more preferably about 110° F. to about 130° F.

One proportioning apparatus that may be used is the H-20/35 Series available from Gusmer Corporation at One Gusmer Drive, Lakewood, N.J., 08701. One spray gun that may be used is the Glas-Craft® Probler Dispense Gun, with a cannon tip, available from Glas-Craft Inc., 5845 West 82$^{nd}$ Street, Indianapolis, Ind., 46278.

It should be noted that the bottom plate 14 may be strapped to a concrete floor such that the use of isolators 130 may be minimized. The bottom plate 14 may be chemically treated ("green" treated).

It should be noted that the stud panel of the present invention may include a double plate on the top plate 12. Such a double plate may not run the entire length of the top plate 12 or may extend beyond an end of the top plate 12 such that the stud panel may be tied into adjacent stud panels.

The length of the present stud panel may be relatively great, such as about 20 to about 28 feet. Shorter or longer stud panels may be formed.

Another advantage of the present invention is that the present stud panel is relatively inexpensive and simple to fabricate and, at the same time, quality is high. Insulation waste is minimized. Further, since insulation is sprayed at a lower pressure and since pressure plate 18 is transparent so as to indicate to the worker the status of the fill of the inner region 24, relatively highly skilled workers need not be employed, even where electrical, mechanical and plumbing peripherals make for irregular or hard to reach spaces in the inner region 24. The present invention is user-friendly, whereas highly skilled workers are essentially a necessity at the construction site. Quality control goes hand in hand with tracking the progress of work visibly and incrementally by the person doing the work first hand. With a more complete fill to the inner regions 24, the R value of the stud panel is increased.

Another advantage of the present invention is that the physical effort required to spray insulation is minimal. When filling an inner region 24 with the present method, there is minimal "waving" of the spray gun and the spray gun itself may be rested on the sheathing resting on the work table. In contrast, at the construction site, the spray gun is fully "waved" back and forth between the studs with the arm extended, and there is no place to rest the weight of the spray gun and attached hoses.

FIG. 18A is a perspective view of an alternate embodiment 300 of the present stud panel being prepared for insulation being blown onto and into the panel. Prefabricated stud panel 300 includes the first or top plate 12, the second or bottom plate 14, the interior sheathing 18 (preferably sheetrock), the end or outer studs 20, the set of interior or inner studs 22, the set of inner regions or spaces 24, and a plurality of thermal breaks 60. A portion of one thermal break 60 is shown in detail in FIG. 18B. Thermal break 60 is formed by spacing an inner edge of inner stud 22 from the inner face of inner sheathing 18.

With such thermal breaks 60, interior sheathing 18 is engaged, preferably by gluing, only to the edges of the end plates 12, 14 and only to the edges of the end studs 20 (i.e., only to the perimeter of the frame of panel 300). It should be noted, however, that the inner face of the interior sheathing 18 may be further engaged to the panel 300 via the insulation 32 when the insulation 32 includes an adhesive or bonding agent. Pin connectors such as nails are preferably not used when engaging interior sheathing to the perimeter. Pin connectors may leave dimples that must be filled in with mud or taping or joint or filler compound. Pin connectors can pop out, such as with expansion or contraction of the sheetrock or panel. Pin connectors can act like a conduit for heat energy transfer.

Stud panel 300 further includes one or more heat duct grille (or cold air return) peripherals 302 that open through the interior sheathing 18 and one or more heat runs or heat run peripherals 304 communicating with one or more openings 306 formed in one or more of end plates 12, 14. Heat run peripheral 304 further communicates with the heat duct grille or cold air return peripheral 302. Heat duct grille or cold air peripheral 302 can be anchored to an inner stud 22 and/or the interior sheathing 18 and/or the heat run peripheral 304. Heat run peripheral 304 can be engaged to the end plates 12, 14 and/or to the heat duct grille or cold air return peripheral 302 and/or to an inner stud 22. Heat run peripheral 304 can run, for example, to a second floor of a house.

Stud panel 300 further includes one or more conduit tube peripherals 308 engaged to and running between end plates 12, 14 where openings 310 of the tube peripherals 308 may be exposed for electrical runs or wire peripherals. Conduit tube peripherals 308 may further communicate with electric box peripherals 312 that can be engaged to an inner stud 22 and/or inner sheathing 18.

FIG. 19 shows a step subsequent to that shown in FIG. 18A. FIG. 19 shows insulation 32 being blown into the panel 300 and onto the inner face of the interior sheathing 18. When insulation 32 is blown into panel 300, panel 300 may be disposed generally horizontally with the open face opening up, generally horizontally with the open face facing down, generally vertically, or at an angle therebetween. Spray gun apparatus or delivery system 70 can be used for automatically introducing insulation 32 or for automatically introducing components that subsequently make up insulation 32. Or spray gun apparatus 34 can be used for introducing insulation 32 or the components that later make up the insulation 34.

FIG. 19 shows that spray outlets or nozzles 90 can be disposed directly overhead (or directly confronting a heightwise medial portion) of alternate regions 24. If desired, six nozzles 90 may be engaged to rail or conduit 72 such that each of the regions 24 receives insulation 32 at the same time and at the same heightwise location as each of the other regions 24. In such a method, rail or conduit 72 is manipulated to move laterally (or at a right angle) to its longitudinal (or end to end) axis. In such a method then, rail or conduit 72 travels from one of the end plates 12, 14 to the other of the end plate 12, 14, with each of the six nozzles 90 spraying insulation at the same time into respective regions 24. Nozzles 90, via respective units 74, can also slid along rail 72 such that, if desired, a nozzle 90 can move laterally relative to its respective region 24 as well as longitudinally (i.e., in the heightwise direction in which rail 72 is moved laterally of its longitudinal axis).

In such a method shown in FIG. 19, no openings 52 are utilized. Further no open ends 28 are utilized. Stud panel 300 is open to and between the end plates 12, 14, and to and between adjacent studs 22, and to and between one end stud 20 and its respective stud 22, and to and between the other end stud 20 and its respective stud 22.

In such a method shown in FIG. 19, insulation 32 is sprayed onto the inner face of the interior sheathing 18. In such a method, insulation 32 preferably includes an adhesive or bonding agent that fixes to the inner face of interior sheathing 18, to the inner studs 22, to the end plates 12, 14, to the outer studs 20 and to peripherals located in the stud panel 300. Such contributes to insulation 32 providing structural support to the interior sheathing 18 and minimizes any bowing or bending or cavity that can occur immediately or over time in interior sheathing 18 and that can be visible from inside a house or other structure having the panel 300.

In such a method shown in FIG. 19, insulation 32 is also blown into thermal breaks 60 such that insulation 32 extends laterally or transversely of inner studs 22, as shown in detail in FIG. 20B, such that insulation 32 in one inner region 24 communicates and is tied to insulation 32 in another inner region 24 which is tied to insulation 32 in still another region 24 and so on such that insulation 32 at one end stud 20 is tied to or engaged with insulation 32 at the other end stud 20 such that an insulation cast is formed in the panel 300.

In such a method shown in FIG. 19, scarfing or trimming of the insulation 32 is minimized by terminating the insulation 32 that is blown in short of the outer edges of the studs 22, short of the outer edges of the end studs 22, and short of the outer edges of the end plates 12, 14 such that an outer rough plane of the insulation 32 terminates short of the inner face of exterior sheathing 16, as shown in FIG. 20B and such that a second thermal break 320 is formed, where the thermal break 320 extends generally continuously to and between the end plates 12, 14, generally continuously to and between each adjacent pair of inner studs 22, and generally continuously to and between each pair of end stud 20 and its respective inner stud 22. The second thermal break 320 is preferably air. However, if desired, a type of insulation other than air can be used for the second thermal break 320 such as a loose fill or a rectangular piece of foam.

FIG. 20A shows a step subsequent to the step or steps shown in FIG. 10. In FIG. 20A, exterior sheathing 16 is engaged to the perimeter of one face of the stud panel 300 (namely to the end plates 12, 14 and to the end studs 20) and is further engaged to the inner studs 22. Such engagement is preferably by pin connectors such as nails. Upon engagement, second thermal breaks 320 are formed and the panel 300 is generally ready for further processing that includes shipping.

Fabrication of stud panel 300 may include one or more of the steps or one or more of the sub-steps of the methods illustrated in FIGS. 16 and 17 and the attendant discussion of FIGS. 16 and 17. For example, stud panel 300 may be fabricated with the following steps performed in the following sequence: framing, squaring, engaging the interior sheathing 18, flipping (if necessary to obtain an upright open face shown in FIGS. 18A and 19), installing peripherals, spraying insulation 32 to form thermal break 320, covering where the step of covering includes the step of using as a cover, for example, nontransparent exterior sheathing 16, stacking, shrink wrapping, and transporting. In such method it is noted that the step of spraying is prior to the step of covering. In such a method, the step of installing peripherals may occur prior to the step of flipping, such as prior to one of the steps of engaging, squaring or framing, or the step of installing peripherals may occur between the steps of framing and squaring, between the steps of squaring and engaging, or between the steps of engaging and flipping.

In the method shown in FIG. 19, it should be noted that thermal break 320 may not be formed such that insulation 32 is sprayed up to or beyond a plane or face defined by the outer edges of end plates 12, 14, the outer edges of end studs 20, and the outer edges of inner studs 22. If sprayed up to such a plane or face, then exterior sheathing 16 may be immediately or almost immediately engaged. If sprayed up to and beyond such a plane or face, then insulation 32 is trimmed or scarfed down to such a plane or face. Further, if desired, scarfing can be accomplished beneath such a plane to form, if desired, the thermal break 320.

FIGS. 21, 22 and 23 show a method where the exterior sheathing 16 is first engaged, whereas, in the method of FIGS. 18A, 18B, 19, 20A and 20B, the interior sheathing 18 is first engaged. Further, in the method shown in FIGS. 21, 22 and 23, the second thermal break 320 is preferably not formed.

FIG. 21 shows a panel 350 being fabricated. Panel 350 includes end plates 12, 14, end studs 20, inner studs 22, inner regions 24, heat run peripheral 304, and electrical box 312 engaged to an inner stud 22. As with panel 300, panel 350 includes an open face with open inner regions 24 for the introduction of insulation 32 therein. Panel 350 further includes the thermal break 60. The panel 350 shown in FIG. 21 can be obtained via the following steps in the following sequence: framing, squaring, engaging the exterior sheathing 16, flipping (if necessary to obtain an upright open face shown in FIGS. 21 and 22), and installing peripherals. The step of installing peripherals may occur prior to the step of flipping, such as prior to one of the steps of engaging, squaring or framing, or the step of installing peripherals may occur between the steps of framing and squaring, between the steps of squaring and engaging, or between the steps of engaging and flipping.

FIG. 22 shows the step of spraying into panel 350 the insulation 32 or the components for the insulation 32. Insulation 32 is sprayed so as to abut and confront the inner face of exterior sheathing 16 and the exposed faces of inner studs 22, end studs 20 and end plates 12, 14. If insulation 32 includes an adhesive, insulation 32 can bond to the exposed surfaces of exterior sheathing 16, inner studs 22, end studs 20 and end plates 12, 14. Insulation 32 is further sprayed at least partially into thermal break 60. Insulation 32 may be sprayed up to and beyond a plane defined by the perimeter defined by the edges of end plates 12, 14 and end studs 20 such that insulation 32 is fully sprayed into thermal break 60. Preferably insulation 32 is automatically controlled so as to terminate spraying such that, after such insulation 32 is in its final form, insulation 32 comes up to and terminates generally at and in such plane. If insulation 32, in its final form, extends beyond such plane, insulation 32 is trimmed or scarfed such as with a bladed instrument 352, as shown in FIG. 23.

Apparatus 70 can include a nozzle 90 for each of regions 24 such that insulation 32 can be introduced in one pass. Or less nozzles than regions 24 can be utilized and insulation can still be introduced in one pass because insulation 32 is to be introduced into the thermal break 60 and on top of the inner edges of the inner studs 22. Rail 72 can move in the heightwise direction of panel 350 and/or the nozzles 90 can be slid along the rail 72.

As shown in FIG. 23, after trimming or scarfing, interior sheathing 18 is engaged, preferably by gluing, to the inner edges of end plates 12, 14 and to the inner edges of end studs 20. Interior sheathing 18 is preferably not engaged to inner studs 22 via pin connectors or via any other type of fastener. Insulation 32, along with end plates 12, 14 and end studs 20, supports the interior sheathing 18 and minimizes bowing or bending of the interior sheathing 18, especially if the insulation 32 is of a blown type and interior sheathing 18 is immediately engaged after insulation 32 is blown into panel 350. A cross section of the structure of panel 350 is like the cross section shown in FIG. 10D, except that panel 350 may not have the peripheral 62 and except that panel 350 does not have the double top plate 12. As indicated above, panel 350 includes thermal break 60 and includes insulation 32 in the thermal break 60 such that insulation 32 extends laterally of the studs 22 and such that insulation 32 in any portion of the interior of panel 350 is tied to insulation 32 in any other portion of the panel 350.

After the interior sheathing 18 is engaged, the steps of stacking, shrink wrapping, and transporting can be performed.

As to the method shown in FIGS. 18A, 18B, 19, 20A and 20B, it should be noted that the interior sheathing 18 may be replaced with the exterior sheathing 16 and that the exterior sheathing 16 may be replaced by the interior sheathing 18.

As to the method shown in FIGS. 21, 22 and 23, it should be noted that the interior sheathing 18 may be replaced with the exterior sheathing 16 and that the exterior sheathing 16 may be replaced by the interior sheathing 18.

What is claimed is:

1. A method of making a prefabricated stud panel, with the prefabricated stud panel comprising i) a first plate; ii) a second plate; iii) exterior sheathing, with the exterior sheathing having an inner face; iv) interior sheathing, with the interior sheathing having an inner face; v) a set of studs between the first and second plates and further between the exterior and interior sheathing, wherein the set of studs includes a pair of outer studs, wherein the set off studs includes a set of inner studs disposed inwardly of the outer studs, wherein each of the studs includes a width running in a direction from the exterior sheathing to the interior sheathing, and wherein the set of studs define a set of inner regions, with each of the inner regions being an area between one pair of adjacent studs, between the first and second plate of said one pair of adjacent studs, and between the exterior and interior sheathing of said one pair of adjacent studs; vi) and wherein the prefabricated stud panel includes a height direction defined by a direction between the first and second plates, a length direction defined by a direction between the outer studs, and a width direction defined by a direction between the exterior and interior sheathing; with said method of making a prefabricated stud panel comprising the steps of:
   a) building a frame comprising the first and second plates, the outer studs, and the inner studs;
   b) engaging one of the exterior and interior sheathing on a first face of said frame such that a second face of the frame is an open face;
   c) introducing cellular polymer insulation into the frame via the open face of the frame such that cellular polymer insulation is introduced into at least one inner region; and then
   d) engaging the other of the exterior and interior sheathing on the second face of the frame to close off the open face and form the prefabricated stud panel; and
   e) with at least one of the inner studs having a width less than a width between the inner faces of the exterior and interior sheathing such that a space is provided between said inner stud and one of the exterior and interior sheathing, and further comprising the step of introducing said cellular polymer insulation into the space such that cellular polymer insulation in one inner region communicates with cellular polymer insulation in an adjacent inner region and such that a thermal break is provided via said inner stud extending incompletely between the exterior and interior sheathing.

2. The method of making a prefabricated stud panel of claim 1, wherein the step of engaging one of the exterior and interior sheathing on a first face of the frame comprises the step of engaging the interior sheathing on the first face of the frame such that interior sheathing is engaged on the frame during the step of introducing cellular polymer insulation into the frame.

3. The method of making a prefabricated stud panel of claim 1, wherein the step of engaging one of the exterior and interior sheathing on a first face of the frame comprises the step of engaging the exterior sheathing on the first face of the frame such that exterior sheathing is engaged on the frame during the step of introducing cellular polymer insulation into the frame.

4. The method of making a prefabricated stud panel of claim 1, wherein the step of introducing cellular polymer insulation into the frame comprises the step of introducing cellular polymer insulation into each of the inner regions.

5. The method of making a prefabricated stud panel of claim 1, wherein the step of introducing cellular polymer insulation includes the steps of first introducing cellular polymer insulation into the frame to the first face of the frame and subsequently introducing cellular polymer insulation to generally a rough plane terminating short of the second face of the frame, wherein the rough plane and the second face are generally parallel to each other and such that a space is formed between the rough plane, where the cellular polymer insulation terminates, and the second face where sheathing will be engaged.

6. The method of making a prefabricated stud panel of claim 1, wherein the step of introducing cellular polymer insulation includes the steps of first introducing cellular polymer insulation into the frame to the first face of the frame and subsequently introducing cellular polymer insulation to generally the second face of the frame where sheathing will be engaged such that the cellular polymer insulation can immediately confront each of the interior and exterior sheathing.

7. The method of making a prefabricated stud panel of claim 1, wherein the step of introducing cellular polymer insulation includes the steps of first introducing cellular polymer insulation into the frame to the first face of the frame and subsequently introducing cellular polymer insulation beyond the second face of the frame such that an excess of cellular polymer insulation has been introduced into the frame.

8. The method of making a prefabricated stud panel of claim 1, and further comprising the step of selecting said inner stud to be an inner stud confronting the exterior sheathing and being spaced from the interior sheathing.

9. The method of making a prefabricated stud panel of claim 1, and further comprising the step of selecting said inner stud to be an inner stud confronting the interior sheathing and being spaced from the exterior sheathing.

10. The method of making a prefabricated stud panel of claim 1, and further comprising the step of automatically introducing cellular polymer insulation into the frame.

11. The method of making a prefabricated stud panel of claim 1, and further comprising the step of introducing insulation into said inner regions substantially simultaneously.

12. The method of making a prefabricated stud panel of claim 1, and further comprising the step of selecting the cellular polymer insulation to be open celled and to have a density of between about 6 kg/m³ and about 20 kg/m³.

13. A prefabricated stud panel, comprising:
   a) a first plate;
   b) a second plate;
   c) exterior sheathing, with the exterior sheathing having an inner face;
   d) interior sheathing, with the interior sheathing having an inner face;
   e) a set of studs between the first and second plates and further between the exterior and interior sheathing, wherein the set of studs includes a pair of outer studs, wherein the set of studs includes a set of inner studs disposed inwardly of the outer studs, wherein each of the studs includes a width running in a direction from the exterior sheathing to the interior sheathing, and wherein the set of studs define a set of inner regions, with each of the inner regions being an area between one pair of adjacent studs, between the first and second plate of said one pair of adjacent studs, and between the exterior and interior sheathing of said one pair of adjacent studs;
   f) wherein the prefabricated stud panel includes a height direction defined by a direction between the first and second plates, a length direction defined by a direction between the outer studs, and a width direction defined by a direction between the exterior and interior sheathing;
   g) cellular polymer insulation in the inner regions and running to and between the first and second plates, to and between the exterior and interior sheathing, and to and between adjacent studs such that the prefabricated stud panel is substantially completely filled with said insulation; and
   h) wherein at least one of the inner studs includes a width less than a distance between the inner faces of the exterior and interior sheathing, with said at least one inner stud confronting one of the exterior and interior sheathing and being spaced from the other of the exterior and interior sheathing, and with insulation being between said at least one inner stud and the sheathing from which said at least one inner stud is spaced.

14. The prefabricated stud panel of claim 13, wherein the interior sheathing comprises gypsum.

15. The prefabricated stud panel of claim 13, wherein said at least one inner stud confronts the exterior sheathing and is spaced from the interior sheathing, and with said cellular polymer insulation being between said at least one inner stud and the interior sheathing.

16. The prefabricated stud panel of claim 13, wherein said at least one inner stud confronts the interior sheathing and is spaced from the exterior sheathing, and with said cellular polymer insulation being between said at least one inner stud and the exterior sheathing.

17. The prefabricated stud panel of claim 13, wherein cellular polymer insulation in any one inner region communicates with cellular polymer insulation in any other inner region.

18. The prefabricated stud panel of claim 13, wherein each of the inner studs is offset from the interior sheathing such that the interior sheathing is free of inner studs.

19. The prefabricated stud panel of claim 13, wherein the cellular polymer insulation comprises open celled cellular polymer insulation having a density of between about 6 kg/m³ and about 20 kg/m³.

20. A prefabricated stud panel, comprising:
   a) a first plate;
   b) a second plate;
   c) exterior sheathing, with the exterior sheathing having an inner face, with the exterior sheathing comprising fiberboard, with the fiberboard comprising compressed wood fibers;
   d) interior sheathing, with the interior sheathing having an inner face, with the interior sheathing comprising gypsum;
   e) a set of studs between the first and second plates and further between the exterior and interior sheathing, wherein the set of studs includes a pair of outer studs, wherein the set of studs includes a set of inner studs disposed inwardly of the outer studs, wherein each of the studs includes a width running in a direction from the exterior sheathing to the interior sheathing, and wherein the set of studs define a set of inner regions, with each of the inner regions being an area between one pair of adjacent studs, between the first and second plate of said one pair of adjacent studs, and between the exterior and interior sheathing of said one pair of adjacent studs;
   f) wherein the prefabricated stud panel includes a height direction defined by a direction between the first and second plates, a length direction defined by a direction between the outer studs, and a width direction defined by a direction between the exterior and interior sheathing;
   g) cellular polymer insulation in the inner regions and running to and between the first and second plates, to and between the exterior and interior sheathing, and to and between adjacent studs such that the stud panel is substantially completely filled with said insulation;
   h) wherein the cellular polymer insulation comprises cellular polymer insulation that is open celled and that has a density of between about 6 kg/m³ and about 20 kg/m³;
   i) wherein each of the inner studs is offset from the interior sheathing such that the interior sheathing is free of inner studs such that a thermal and sound break is formed between the interior sheathing and the inner studs, and with the cellular polymer insulation being disposed in the thermal and sound break; and
   j) wherein the cellular polymer insulation terminates generally short of the exterior sheathing such that an air space is formed adjacent to the exterior sheathing, with the cellular polymer insulation running in the width direction from where the cellular polymer terminates generally short of the exterior sheathing to the interior sheathing to provide support for the interior sheathing.

21. A method of making a prefabricated stud panel, with the prefabricated stud panel comprising i) a first plate; ii) a second plate; iii) exterior sheathing, with the exterior sheathing having an inner face; iv) interior sheathing, with the interior sheathing having an inner face; v) a set of studs between the first and second plates and further between the exterior and interior sheathing, wherein the set of studs includes a pair of outer studs, wherein the set of studs includes a set of inner studs disposed inwardly of the outer studs, wherein each of the studs includes a width running in a direction from the exterior sheathing to the interior sheathing, and wherein the set of studs define a set of inner regions, with each of the inner regions being an area between one pair of adjacent studs, between the first and second plate of said one pair of adjacent studs, and between the exterior and interior sheathing of said one pair of adjacent studs; vi) and wherein the prefabricated stud panel includes a height direction defined by a direction between the first and second plates, a length direction defined by a direction between the outer studs, and a width direction defined by a direction between the exterior and interior sheathing; with said method of making a prefabricated stud panel comprising the steps of:

a) building a frame comprising the first and second plates, the outer studs, and the inner studs;
b) engaging one of the exterior and interior sheathing on a first face of said frame such that a second face of the frame is an open face;
c) introducing cellular polymer insulation into the frame such that cellular polymer insulation is introduced into at least one inner region; and then
d) engaging the other of the exterior and interior sheathing on the second face of the frame to close off the open face and form the prefabricated stud panel; and
e) with at least one of the inner studs having a width less than a width between the inner faces of the exterior and interior sheathing such that a space is provided between said inner stud and one of the exterior and interior sheathing, and further comprising the step of introducing said cellular polymer insulation into the space such that cellular polymer insulation in one inner region communicates with cellular polymer insulation in an adjacent inner region and such that a thermal break is provided via said inner stud extending incompletely between the exterior and interior sheathing.

* * * * *